US011336312B2

(12) United States Patent
Takeuchi et al.

(10) Patent No.: US 11,336,312 B2
(45) Date of Patent: May 17, 2022

(54) RADIO FREQUENCY MODULE AND COMMUNICATION DEVICE

(71) Applicant: Murata Manufacturing Co., Ltd., Nagaokakyo (JP)

(72) Inventors: Morio Takeuchi, Nagaokakyo (JP); Yukiya Yamaguchi, Nagaokakyo (JP); Yoichi Sawada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 79 days.

(21) Appl. No.: 17/022,117

(22) Filed: Sep. 16, 2020

(65) Prior Publication Data

US 2021/0091803 A1 Mar. 25, 2021

(30) Foreign Application Priority Data

Sep. 20, 2019 (JP) .............................. JP2019-171740

(51) Int. Cl.
*H04B 1/04* (2006.01)
*H04B 1/10* (2006.01)
*H04B 1/16* (2006.01)

(52) U.S. Cl.
CPC ............ *H04B 1/04* (2013.01); *H04B 1/1018* (2013.01); *H04B 1/1615* (2013.01); *H04B 2001/0416* (2013.01); *H04B 2001/1063* (2013.01)

(58) Field of Classification Search
CPC ........ H04B 1/0057; H04B 1/006; H04B 1/04; H04B 1/0458; H04B 1/1018; H04B 1/1615; H04B 1/18; H04B 2001/0416
See application file for complete search history.

(56) References Cited

U.S. PATENT DOCUMENTS

2016/0099192 A1* 4/2016 Chen ...................... H01L 24/97
361/772
2019/0190548 A1 6/2019 Chang et al.

FOREIGN PATENT DOCUMENTS

JP 2018-196110 A 12/2018
WO 2018/168500 A1 9/2018

OTHER PUBLICATIONS

Korean Office Action dated Jul. 13, 2021, in corresponding Korean Patent Application No. 10-2020-0117481.

* cited by examiner

*Primary Examiner* — David S Huang
(74) *Attorney, Agent, or Firm* — Xsensus LLP

(57) ABSTRACT

A radio frequency module includes: a switch that includes: a common terminal connected to a first common transmission path; a first selection terminal connected to a first transmission path; and a second selection terminal connected to a second transmission path, and switches between connecting the common terminal to the first selection terminal and to the second selection terminal; a transmission power amplifier disposed on the module board and on first common transmission path; and first circuit components disposed on a reception path. The first transmission path is a path through which a transmission signal of a first communication band is transferred, the second transmission path is a path through which a transmission signal of a second communication band is transferred, the switch is disposed on a first principal surface, and at least one of the first circuit components is disposed on a second principal surface.

20 Claims, 15 Drawing Sheets

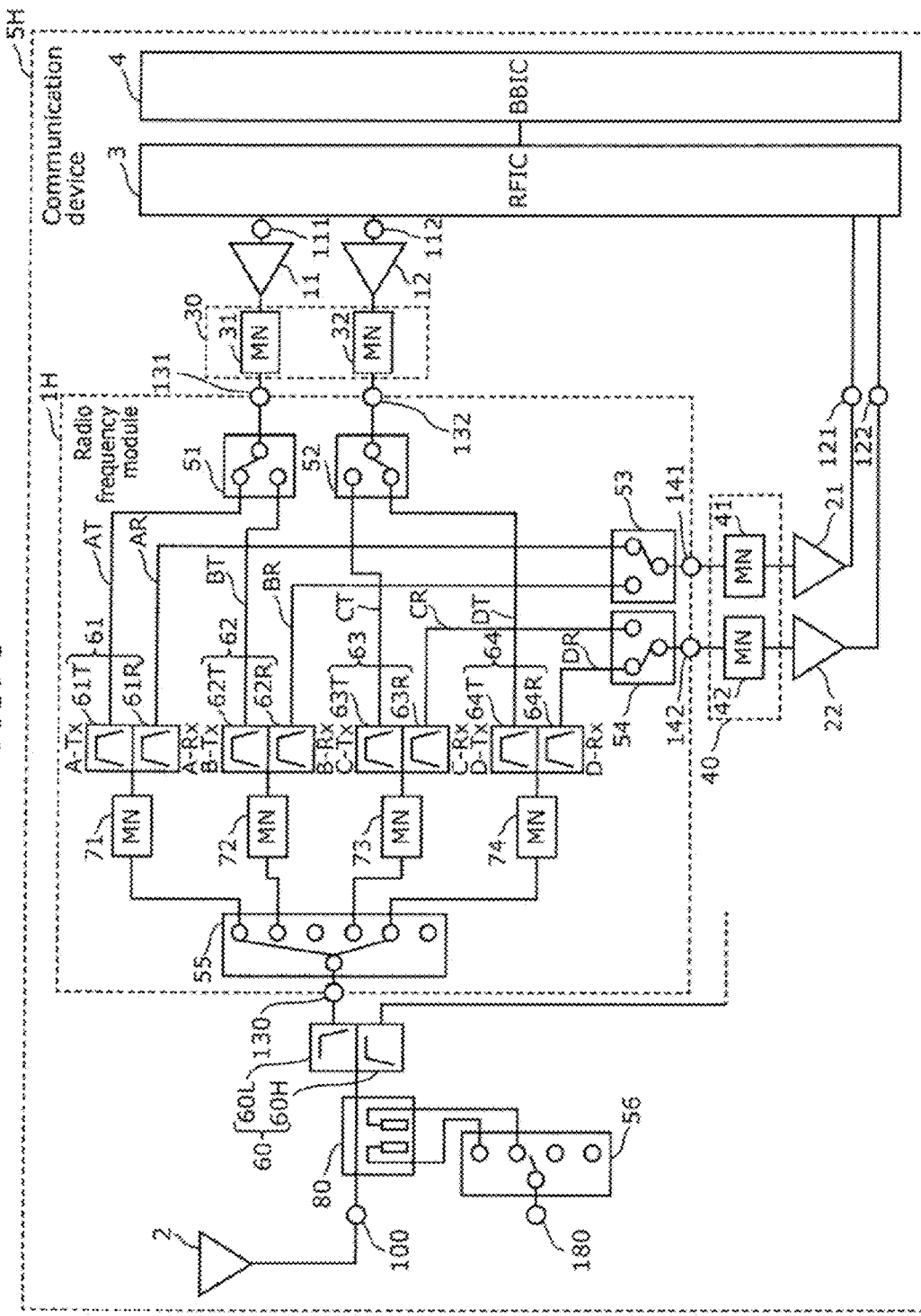

RADIO FREQUENCY MODULE AND COMMUNICATION DEVICE

CROSS REFERENCE TO RELATED APPLICATION

The present application is based on and claims priority of Japanese Patent Application No. 2019-171740 filed on Sep. 20, 2019. The entire disclosure of the above-identified application, including the specification, drawings and claims is incorporated herein by reference in its entirety.

TECHNICAL FIELD

The present disclosure relates to a radio frequency module and a communication device.

BACKGROUND

In mobile communication apparatuses such as mobile phones, development in multiband technology, in particular, has been complicating the arrangement of circuit elements included in radio frequency (RF) front-end circuits.

U.S. Patent Application Publication No. 2019/190548 discloses a front-end circuit that allows carrier aggregation (CA) using a plurality of communication bands (frequency bands). Specifically, the front-end circuit includes: a first transmission path to which a first power amplifier, a first band selection switch that selects a communication band for CA, a plurality of duplexers for communication bands, and an antenna switch are connected in this order; and a second transmission path to which a second power amplifier, a second band selection switch that selects a communication band for CA, a plurality of duplexers for communication bands, and an antenna switch are connected in this order. Accordingly, the front-end circuit can simultaneously transmit a transmission signal of a first communication band through the first transmission path and a transmission signal of a second communication band through the second transmission path.

SUMMARY

Technical Problems

However, as recognized by the present inventor, there is a problem that if the front-end circuit disclosed in U.S. Patent Application Publication No. 2019/190548 is achieved by a single radio frequency module as a small front-end circuit in a mobile communication apparatus, the first band selection switch or the second band selection switch for transferring a high-power transmission signal output from the power amplifier is coupled with at least one of circuit components disposed on a reception path via a magnetic field, an electric field, or an electromagnetic field, which allows the transmission signal, harmonics of the transmission signal, or intermodulation distortion, for instance, to sneak into the reception path, resulting in deterioration in reception sensitivity of the reception path.

The present disclosure addresses the above-identified and other problems, and is to provide a radio frequency module that reduces deterioration in reception sensitivity, and a communication device that includes the radio frequency module.

Solutions

In order to provide such a radio frequency module, a radio frequency module according to an aspect of the present disclosure includes: a module board that includes a first principal surface and a second principal surface on opposite sides of the module board; a transmission input terminal; a reception output terminal; an input/output terminal; a first switch that includes: a common terminal that is connected to a common transmission path connected to the transmission input terminal; a first selection terminal that is connected to a first transmission path connected to the input/output terminal; and a second selection terminal that is connected to a second transmission path connected to the input/output terminal, the first switch configured to controllably switch connection of the common terminal to the first selection terminal the second selection terminal; a transmission power amplifier disposed on the module board and on common transmission path; and one or more first circuit components disposed on a reception path connected to the reception output terminal and the input/output terminal. The first transmission path is a signal path through which a transmission signal of a first communication band is transferred, the second transmission path is a signal path through which a transmission signal of a second communication band is transferred, the first switch is disposed on the first principal surface, and at least one of the one or more first circuit components is disposed on the second principal surface.

Advantageous Effects

According to the present disclosure, a radio frequency module that reduces deterioration in reception sensitivity, and a communication device that includes the radio frequency module can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 illustrates a circuit configuration of a radio frequency module and a communication device according to Example 4.

DESCRIPTION OF EMBODIMENTS

Figure 1:
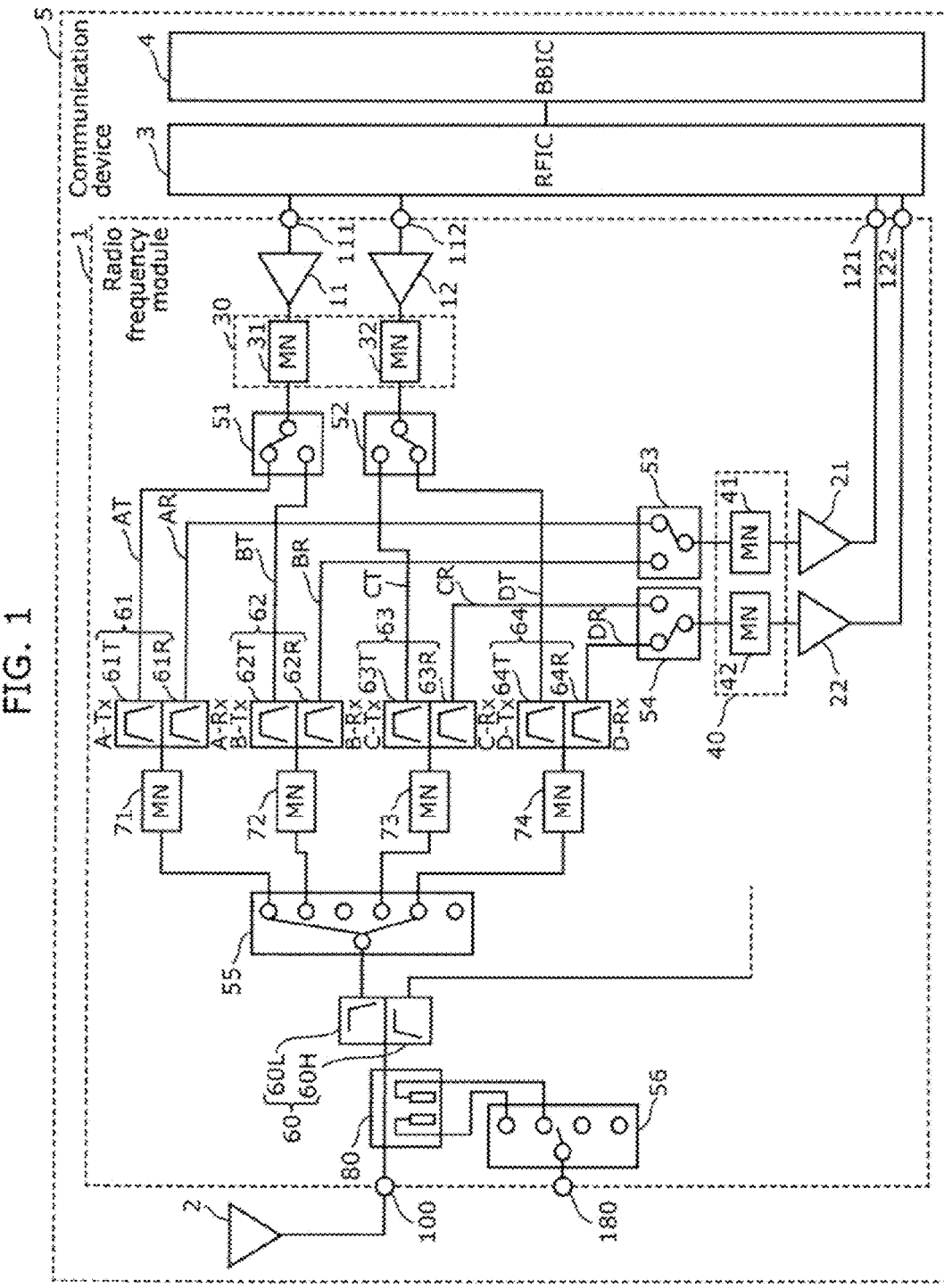
FIG. 1 illustrates a circuit configuration of a radio frequency module (or RF front-end circuitry) and a communication device according to an embodiment.

The following describes in detail embodiments of the present disclosure. Note that the embodiments described below each show a general or specific example. The numerical values, shapes, materials, elements, the arrangement and connection of the elements, and others indicated in the following embodiments are mere examples, and therefore are not intended to limit the present disclosure. Thus, among the elements in the following examples and variations, elements not recited in any independent claim are described as arbitrary elements. In addition, the sizes of elements and the ratios of the sizes illustrated in the drawings are not necessarily accurate. Throughout the drawings, the same numeral is given to substantially the same element, and redundant description may be omitted or simplified.

In the following, a term that indicates a relation between elements such as "parallel" or "perpendicular", a term that indicates the shape of an element such as "rectangular", and a numerical range do not necessarily have only strict meanings, and also have substantially equivalent meanings that include a difference of about several percent, for example.

In the following, regarding A, B, and C mounted on a board, "C is disposed between A and B in a plan view of a board (or a principal surface of a board)" means a straight line that connects an arbitrary point in A and an arbitrary point in B passes through a region of C in a plan view of a board. A plan view of a board means that a board and a circuit element mounted on the board are viewed, being orthogonally projected onto a plane parallel to the board.

In the following, a "transmission path" means a transfer route that includes, for instance, a line through which a radio frequency transmission signal propagates, an electrode directly connected to the line, and a terminal directly connected to the line or the electrode. Further, a "reception path" means a transfer route that includes, for instance, a line through which a radio frequency reception signal propagates, an electrode directly connected to the line, and a terminal directly connected to the line or the electrode. In addition, a "signal path" means a transfer route that includes, for instance, a line through which a radio frequency signal propagates, an electrode directly connected to the line, and a terminal directly connected to the line or the electrode.

In the following, "A and B are connected" applies not only when A and B are physically connected, but also when A and B are electrically connected. Furthermore, as used herein the terms "circuit" or "circuitry" means one or more circuits, including discrete circuit(s) as well as circuit board(s) and combinations thereof.

Embodiment

1. Circuit Configuration of Radio Frequency Module 1 and Communication Device 5

FIG. 1 illustrates a circuit configuration of radio frequency module 1 and communication device 5 according to an embodiment. As illustrated in FIG. 1, communication device 5 includes radio frequency module 1, antenna 2, radio frequency (RF) signal processing circuit (RF integrated circuit (RFIC)) 3, and baseband signal processing circuit (BB integrated circuit (BBIC)) 4. In this exemplary configuration the communication device is a multi-band transceiver. As used in this specification the term "module", as used with "radio frequency module", or "RF front-end module" should be construed as circuitry (programmable, as well as discrete) and associated circuit components, such as circuit boards, RF shielding, etc.

RFIC 3 is an RF signal processing circuit that processes radio frequency signals transmitted and received by antenna 2. Specifically, RFIC 3 processes a reception signal input through a reception path of radio frequency module 1 by down-conversion, for instance, and outputs a reception signal generated by being processed to BBIC 4. RFIC 3 processes a transmission signal input from BBIC 4 by up-conversion, for instance, and outputs a transmission signal generated by being processed to a transmission path of radio frequency module 1.

BBIC 4 is a circuit that processes signals using an intermediate frequency band lower than the frequency range of a radio frequency signal transferred in radio frequency module 1. A signal processed by BBIC 4 is used, for example, as an image signal for image display or as an audio signal for talk through a loudspeaker.

RFIC 3 also has a function as a controller that controls connection made by switches 51, 52, 53, 54, 55, and 56 included in radio frequency module 1, based on a communication band (a frequency band) to be used. Specifically, RFIC 3 changes connection made by switches 51 to 56 included in radio frequency module 1 according to a control signal (not illustrated). Note that the controller may be disposed outside RFIC 3, and may be disposed in radio frequency module 1 or BBIC 4, for example. Moreover, in one example the controller is a remote computer, or a distributed computer system that communicates with the radio frequency module 1 via a wireless or wired connection. Likewise, in another example, the controller is a local controller with a user interface that converts input signals into control commands that control the communication device 5 as well as subcomponents, such as the RF module 1.

Antenna 2 is connected to antenna connection terminal 100 of radio frequency module 1, radiates a radio frequency signal output from radio frequency module 1, and receives and outputs a radio frequency signal from the outside to radio frequency module 1.

Note that antenna 2 and BBIC 4 are not necessarily included in communication device 5 according to the present embodiment.

Next, a detailed configuration of radio frequency module 1 is to be described.

As illustrated in FIG. 1, radio frequency module 1 includes antenna connection terminal 100, transmission power amplifiers 11 and 12, reception low noise amplifiers (LNAs) 21 and 22, transmission filters 61T, 62T, 63T, and 64T, reception filters 61R, 62R, 63R, and 64R, transmission output matching circuit 30, reception input matching circuit 40, matching circuits 71, 72, 73, and 74, switches 51, 52, 53, 54, 55, and 56, diplexer 60, coupler 80, and coupler output terminal 180.

Antenna connection terminal 100 is an example of an input/output terminal, and is an antenna common terminal connected to antenna 2.

Transmission power amplifier 11 amplifies radio frequency signals, input through transmission input terminal 111, of communication band A (a first communication band) and communication band B (a second communication band) that belong to a first frequency band group. Transmission power amplifier 12 amplifies radio frequency signals, input through transmission input terminal 112, of communication band C and communication band D that belong to a second frequency band group having different frequency bands from the first frequency band group.

Reception low noise amplifier 21 amplifies radio frequency signals of communication band A and communication band B while maintaining noise low, and outputs the amplified signals to reception output terminal 121. Reception low noise amplifier 22 amplifies radio frequency signals of communication band C and communication band D while maintaining noise low, and outputs the amplified signals to reception output terminal 122.

Transmission filter 61T is disposed on transmission path AT that connects transmission power amplifier 11 and antenna connection terminal 100, and passes a transmission signal of the transmission band of communication band A, within a transmission signal amplified by transmission power amplifier 11. Transmission filter 62T is disposed on transmission path BT that connects transmission power amplifier 11 and antenna connection terminal 100, and passes a transmission signal of the transmission band of communication band B, within a transmission signal amplified by transmission power amplifier 11. Transmission filter 63T is disposed on transmission path CT that connects transmission power amplifier 12 and antenna connection terminal 100, and passes a transmission signal of the transmission band of communication band C, within a transmission signal amplified by transmission power amplifier 12. Transmission filter 64T is disposed on transmission path DT that connects transmission power amplifier 12 and antenna connection terminal 100, and passes a transmission signal of the transmission band of communication band D, within a transmission signal amplified by transmission power amplifier 12.

Reception filter 61R is disposed on reception path AR that connects reception low noise amplifier 21 and antenna connection terminal 100, and passes a reception signal of the reception band of communication band A, within a reception signal input through antenna connection terminal 100. Reception filter 62R is disposed on reception path BR that connects reception low noise amplifier 21 and antenna connection terminal 100, and passes a reception signal of the reception band of communication band B, within a reception signal input through antenna connection terminal 100. Reception filter 63R is disposed on reception path CR that connects reception low noise amplifier 22 and antenna connection terminal 100, and passes a reception signal of the reception band of communication band C, within a reception signal input through antenna connection terminal 100. Reception filter 64R is disposed on reception path DR that connects reception low noise amplifier 22 and antenna connection terminal 100, and passes a reception signal of the reception band of communication band D, within a reception signal input through antenna connection terminal 100.

Transmission filter 61T and reception filter 61R are included in duplexer 61 having a passband that is communication band A. Transmission filter 62T and reception filter 62R are included in duplexer 62 having a passband that is communication band B. Transmission filter 63T and reception filter 63R are included in duplexer 63 having a passband that is communication band C. Transmission filter 64T and reception filter 64R are included in duplexer 64 having a passband that is communication band D.

Note that duplexers 61 to 64 may each be a multiplexer that includes only a plurality of transmission filters, a multiplexer that includes only a plurality of reception filters, or a multiplexer that includes a plurality of duplexers.

Transmission path AT is an example of a first transmission path, through which a transmission signal of communication band A is transferred. One end of transmission path AT is connected to switch 51, and the other end of transmission path AT is connected to antenna connection terminal 100. Transmission path BT is an example of a second transmission path, through which a transmission signal of communication band B is transferred. One end of transmission path BT is connected to switch 51, and the other end of transmission path BT is connected to antenna connection terminal 100. Transmission path CT is a path through which a transmission signal of communication band C is transferred. One end of transmission path CT is connected to switch 52, and the other end of transmission path CT is connected to antenna connection terminal 100. Transmission path DT is a path through which a transmission signal of communication band D is transferred. One end of transmission path DT is connected to switch 52, and the other end of transmission path DT is connected to antenna connection terminal 100. A first common transmission path is a path through which transmission signals of communication bands A and B are transferred. One end of the first common transmission path is connected to transmission input terminal 111, and the other end is connected to a common terminal of switch 51. A second common transmission path is a path through which transmission signals of communication bands C and D are transferred. One end of the second common transmission path is connected to transmission input terminal 112, and the other end is connected to a common terminal of switch 52.

Reception path AR is an example of a first reception path, through which a reception signal of communication band A is transferred. One end of reception path AR is connected to antenna connection terminal 100, and the other end of reception path AR is connected to reception output terminal 121. Reception path BR is an example of a second reception path, through which a reception signal of communication band B is transferred. One end of reception path BR is connected to antenna connection terminal 100, and the other end of reception path BR is connected to reception output terminal 121. Reception path CR is a path through which a reception signal of communication band C is transferred. One end of reception path CR is connected to antenna connection terminal 100, and the other end of reception path CR is connected to reception output terminal 122. Reception path DR is a path through which a reception signal of communication band D is transferred. One end of reception path DR is connected to antenna connection terminal 100, and the other end of reception path DR is connected to reception output terminal 122.

Transmission output matching circuit 30 includes matching circuits 31 and 32. Matching circuit 31 is disposed on transmission paths that connect transmission power amplifier 11 to transmission filters 61T and 62T, and matches the impedance between transmission power amplifier 11 and transmission filters 61T and 62T. Matching circuit 32 is disposed on transmission paths that connect transmission power amplifier 12 to transmission filters 63T and 64T, and matches the impedance between transmission power amplifier 12 and transmission filters 63T and 64T.

Reception input matching circuit 40 includes matching circuits 41 and 42. Matching circuit 41 is disposed on reception paths that connect reception low noise amplifier 21 to reception filters 61R and 62R, and matches the impedance between reception low noise amplifier 21 and reception filters 61R and 62R. Matching circuit 42 is disposed on reception paths that connect reception low noise amplifier 22 to reception filters 63R and 64R, and matches the impedance between reception low noise amplifier 22 and reception filters 63R and 64R.

Switch 51 is an example of a first switch, and includes a common terminal, a first selection terminal, and a second selection terminal. The common terminal of switch 51 is connected to the first common transmission path connected to transmission input terminal 111. The first selection terminal of switch 51 is connected to one end of transmission path AT, and the second selection terminal of switch 51 is connected to one end of transmission path BT. This connection configuration allows switch 51 to switch between connecting the common terminal to the first selection terminal and connecting the common terminal to the second selection terminal. Specifically, switch 51 switches between connecting transmission power amplifier 11 to transmission path AT and connecting transmission power amplifier 11 to transmission path BT. The first selection terminal of switch 51 is connected to transmission filter 61T, and the second selection terminal of switch 51 is connected to transmission filter 62T. Specifically, switch 51 switches between connecting transmission power amplifier 11 to transmission filter 61T and connecting transmission power amplifier 11 to transmission filter 62T. Switch 51 includes a single pole double throw (SPDT) switch circuit, for example.

Switch 52 includes a common terminal and two selection terminals. The common terminal of switch 52 is connected to the second common transmission path connected to transmission input terminal 112. One selection terminal out of the selection terminals of switch 52 is connected to an end of transmission path CT, and the other selection terminal out of the selection terminals of switch 52 is connected to an end of transmission path DT. This connection configuration allows switch 52 to switch between connecting the common terminal to the one selection terminal and connecting the common terminal to the other selection terminal. Specifically, switch 52 switches between connecting transmission power amplifier 12 to transmission path CT and connecting transmission power amplifier 12 to transmission path DT. Switch 52 includes an SPDT switch circuit, for example.

Switch 53 is an example of a second switch, and includes a common terminal, a third selection terminal, and a fourth selection terminal. The common terminal of switch 53 is connected to an input terminal of reception low noise amplifier 21 via matching circuit 41. The third selection terminal of switch 53 is connected to reception filter 61R disposed on reception path AR, and the fourth selection terminal of switch 53 is connected to reception filter 62R disposed on reception path BR. This connection configuration allows switch 53 to switch between connecting and disconnecting the common terminal to/from the third selection terminal and to switch between connecting and disconnecting the common terminal to/from the fourth selection terminal. Specifically, switch 53 switches between connecting and disconnecting reception low noise amplifier 21 to/from reception path AR, and switches between connecting and disconnecting reception low noise amplifier 21 to/from reception path BR. Switch 53 includes an SPDT switch circuit, for example.

Switch 54 includes a common terminal and two selection terminals. The common terminal of switch 54 is connected to the input terminal of reception low noise amplifier 22 via matching circuit 42. One selection terminal out of the selection terminals of switch 54 is connected to reception filter 63R disposed on reception path CR, and the other selection terminal out of the selection terminals of switch 54 is connected to reception filter 64R disposed on reception path DR. This connection configuration allows switch 54 to switch between connecting and disconnecting the common terminal to/from the one selection terminal, and to switch between connecting and disconnecting the common terminal to/from the other selection terminal. Specifically, switch 54 switches between connecting and disconnecting reception low noise amplifier 22 to/from reception path CR, and switches between connecting and disconnecting reception low noise amplifier 22 to/from reception path DR. Switch 54 includes an SPDT switch circuit, for example.

Switch 55 is an example of an antenna switch, is connected to antenna connection terminal 100 via diplexer 60, and switches among (1) connecting antenna connection terminal 100 to transmission path AT and reception path AR, (2) connecting antenna connection terminal 100 to transmission path BT and reception path BR, (3) connecting antenna connection terminal 100 to transmission path CT and reception path CR, and (4) connecting antenna connection terminal 100 to transmission path DT and reception path DR. Note that switch 55 includes a multiple connection switch circuit that allows two or more simultaneous connections of (1) to (4) above.

Matching circuit 71 is disposed on a path that connects switch 55 and duplexer 61, and matches the impedance between (i) duplexer 61 and (ii) antenna 2 and switch 55. Matching circuit 72 is disposed on a path that connects switch 55 and duplexer 62, and matches the impedance between (i) duplexer 62 and (ii) antenna 2 and switch 55. Matching circuit 73 is disposed on a path that connects switch 55 and duplexer 63, and matches the impedance between (i) duplexer 63 and (ii) antenna 2 and switch 55. Matching circuit 74 is disposed on a path that connects switch 55 and duplexer 64, and matches the impedance between (i) duplexer 64 and (ii) antenna 2 and switch 55.

Diplexer 60 is an example of a multiplexer, and includes filters 60L and 60H. Filter 60L has a passband whose frequency range includes the first frequency band group and the second frequency band group, and filter 60H has a passband whose frequency range includes another frequency band group having different bands from the first frequency band group and the second frequency band group. One terminal of filter 60L and one terminal of filter 60H are connected in common to antenna connection terminal 100. Filters 60L and 60H are each an LC filter that includes at least one of a chip inductor or a chip capacitor. Note that when the first frequency band group and the second frequency band group have lower frequency bands than the other frequency band group, filter 60L may be a lowpass filter, and filter 60H may be a highpass filter.

Coupler 80 and switch 56 are circuits that monitor power intensity of radio frequency signals transferred between antenna connection terminal 100 and switch 55, and output the monitored power intensity to RFIC 3, for instance, through coupler output terminal 180.

Note that transmission filters 61T to 64T and reception filters 61R to 64R described above may each be one of, for example, an acoustic wave filter that uses surface acoustic waves (SAWs), an acoustic wave filter that uses bulk acoustic waves (BAWs), an LC resonance filter, and a dielectric filter and furthermore, are not limited to those filters.

Transmission power amplifiers 11 and 12 and reception low noise amplifiers 21 and 22 each include, for instance, a field effect transistor (FET) or a hetero-bipolar transistor (HBT) made of, for example, a Si-based complementary metal oxide semiconductor (CMOS) or GaAs.

Reception low noise amplifiers 21 and 22 and switches 53, 54, and 55 may be formed in one semiconductor integrated circuit (IC). Furthermore, the semiconductor IC may also include transmission power amplifiers 11 and 12 and switches 51 and 52. The semiconductor IC includes a CMOS, for example. Specifically, the semiconductor IC is formed by the silicon on insulator (SOI) process. Accordingly, the semiconductor IC can be manufactured at a low cost. Note that the semiconductor IC may include at least one of GaAs, SiGe, or GaN. Thus, a radio frequency signal having high amplification quality and high noise quality can be output.

Note that matching circuits 71 to 74, coupler 80, switch 56, and coupler output terminal 180 are elements that are not necessarily included in the radio frequency module according to the present disclosure.

In the configuration of radio frequency module 1 described above, transmission power amplifier 11, matching circuit 31, switch 51, transmission filter 61T, matching circuit 71, switch 55, and filter 60L are included in a first transmission circuit that transfers a transmission signal of communication band A towards antenna connection terminal 100. Filter 60L, switch 55, matching circuit 71, reception filter 61R, switch 53, matching circuit 41, and reception low noise amplifier 21 are included in a first reception circuit that transfers a reception signal of communication band A from antenna 2 through antenna connection terminal 100.

Transmission power amplifier 11, matching circuit 31, switch 51, transmission filter 62T, matching circuit 72, switch 55, and filter 60L are included in a second transmission circuit that transfers a transmission signal of communication band B towards antenna connection terminal 100. Filter 60L, switch 55, matching circuit 72, reception filter 62R, switch 53, matching circuit 41, and reception low noise amplifier 21 are included in a second reception circuit that transfers a reception signal of communication band B from antenna 2 through antenna connection terminal 100.

Transmission power amplifier 12, matching circuit 32, switch 52, transmission filter 63T, matching circuit 73, switch 55, and filter 60L are included in a third transmission circuit that transfers a transmission signal of communication band C towards antenna connection terminal 100. Filter 60L, switch 55, matching circuit 73, reception filter 63R, switch 54, matching circuit 42, and reception low noise amplifier 22 are included in a third reception circuit that transfers a reception signal of communication band C from antenna 2 through antenna connection terminal 100.

Transmission power amplifier 12, matching circuit 32, switch 52, transmission filter 64T, matching circuit 74, switch 55, and filter 60L are included in a fourth transmission circuit that transfers a transmission signal of communication band D towards antenna connection terminal 100. Filter 60L, switch 55, matching circuit 74, reception filter 64R, switch 54, matching circuit 42, and reception low noise amplifier 22 are included in a fourth reception circuit that transfers a reception signal of communication band D from antenna 2 through antenna connection terminal 100.

According to the above circuit configuration, radio frequency module 1 can carry out at least one of simultaneous transmission, simultaneous reception, or simultaneous transmission and reception of a radio frequency signal of communication band A or B and a radio frequency signal of communication band C or D.

Note that in the radio frequency module according to the present disclosure, the four transmission circuits and the four reception circuits may not be connected to antenna connection terminal 100 via switch 55, and may be connected to antenna 2 via different terminals. The radio frequency module according to the present disclosure may at least include the first transmission circuit, the second transmission circuit, and the first reception circuit. In this case, the radio frequency module can carry out (1) simultaneous transmission of a signal of communication band A and reception of a signal of communication band A, and (2) simultaneous transmission of a signal of communication band A and reception of a signal of communication band B.

In the radio frequency module according to the present disclosure, the first transmission circuit may include transmission power amplifier 11, switch 51, and transmission path AT. The second transmission circuit may include transmission power amplifier 11, switch 51, and transmission path BT. The first reception circuit may include reception path AR and at least one of reception low noise amplifier 21, matching circuit 41, switch 53, reception filter 61R, matching circuit 71, switch 55, or filter 60L.

Here, when circuit elements included in radio frequency module 1 are included in one module as a small front-end circuit, the first transmission circuit and the second transmission circuit, for example, are assumed to be disposed close to the first reception circuit. In this case, when a high-power transmission signal output from transmission power amplifier 11 is transferred through transmission path AT or BT, a problem arises that reception sensitivity of at least one of reception path AR, BR, CR, or DR deteriorates due to the transmission signal, harmonics, or intermodulation distortion sneaking into the at least one of reception path AR, BR, CR, or DR. In particular, switch 51 that selects a transmission path passes a high-power transmission signal output from transmission power amplifier 11. Accordingly, it is assumed that not only the transmission signal, but harmonics occur due to, for example, nonlinear operation of switch 51, and the transmission signal and harmonics sneak into at least one of reception path AR, BR, CR, or DR as spurious waves, which decreases reception sensitivity.

For example, there is a case where the frequencies of harmonics of a transmission signal of communication band A amplified by transmission power amplifier 11 overlap at least partially the reception band of communication band B. Also, for example, there is a case where frequencies of intermodulation distortion caused by a transmission signal amplified by transmission power amplifier 11 and a transmission signal amplified by transmission power amplifier 12 overlap at least partially the reception bands of communication bands A to D.

In contrast, radio frequency module 1 according to the present embodiment has a configuration for preventing switches 51 and 52 from coupling with circuit components on the reception paths via an electric field, a magnetic field, or an electromagnetic field. The following describes a configuration of radio frequency module 1 according to the present embodiment for preventing coupling via an electric field, a magnetic field, or an electromagnetic field.

2. Arrangement of Circuit Elements of Radio Frequency Module 1A According to Example 1

Figure 2A:
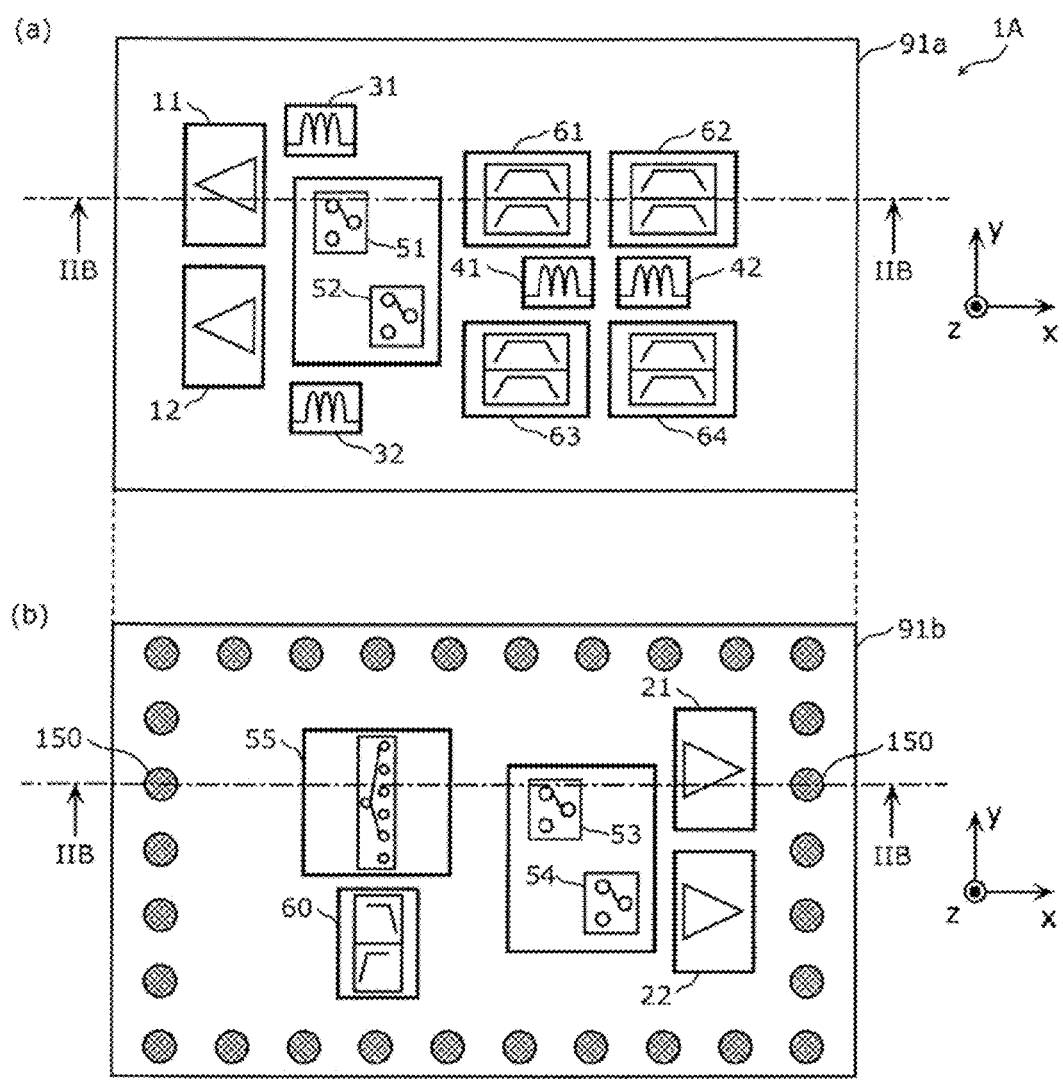
FIG. 2A is a schematic diagram illustrating a planar configuration of a radio frequency module according to Example 1.
Figure 2B:
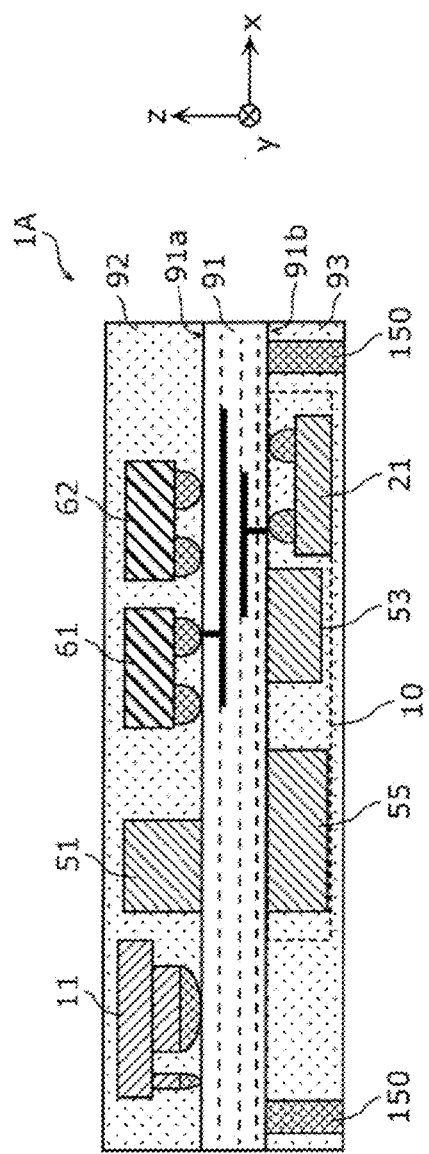
FIG. 2B is a schematic diagram illustrating a cross-sectional configuration of the radio frequency module according to Example 1.

FIG. 2A is a schematic diagram illustrating a planar configuration of radio frequency module 1A according to Example 1. FIG. 2B is a schematic diagram illustrating a cross-sectional configuration of radio frequency module 1A according to Example 1 and specifically, illustrates a cross section taken along line JIB to JIB in FIG. 2A. Note that (a) of FIG. 2A illustrates a layout of circuit elements when principal surface 91a out of principal surfaces 91a and 91b on opposite sides of module board 91 is viewed from the positive z-axis. On the other hand, (b) of FIG. 2A is a perspective view of the layout of circuit elements when principal surface 91b is viewed from the positive z-axis.

Radio frequency module 1A according to Example 1 shows a specific arrangement of circuit elements included in radio frequency module 1 according to the embodiment.

As illustrated in FIGS. 2A and 2B, radio frequency module 1A according to this example further includes module board 91 and resin members 92 and 93, in addition to the circuit configuration illustrated in FIG. 1.

Module board 91 is a board which includes principal surface 91a (a first principal surface) and principal surface 91b (a second principal surface) on opposite sides of module board 91, and on which the above transmission circuits and the above reception circuits are mounted. As module board 91, a low temperature co-fired ceramics (LTCC) board having a stacked structure of a plurality of dielectric layers, a high temperature co-fired ceramics (HTCC) board, a component-embedded board, a board that includes a redistribution layer (RDL), or a printed circuit board, for example, is used. Note that antenna connection terminal 100, transmission input terminals 111 and 112, and reception output terminals 121 and 122 may be formed on module board 91.

Resin member 92 is disposed on principal surface 91a of module board 91, covers at least partially the transmission circuits, at least partially the reception circuits, and principal surface 91a of module board 91, and has a function of ensuring reliability of mechanical strength and moisture resistance, for instance, of the circuit elements included in the transmission circuits and the reception circuits. Resin member 93 is disposed on principal surface 91b of module board 91, covers at least partially the transmission circuits, at least partially the reception circuits, and principal surface 91b of module board 91, and has a function of ensuring reliability of mechanical strength and moisture resistance, for instance, of the circuit elements included in the transmission circuits and the reception circuits. Note that resin members 92 and 93 are elements not necessarily included in the radio frequency module according to the present disclosure.

Matching circuits 31, 32, 41, and 42 each at least include a chip inductor.

As illustrated in FIGS. 2A and 2B, in radio frequency module 1A according to this example, transmission power amplifiers 11 and 12, duplexers 61 to 64, switches 51 and 52, and matching circuits 31, 32, 41, and 42 are mounted on principal surface 91a of module board 91. On the other hand, reception low noise amplifiers 21 and 22, switches 53, 54, and 55, and diplexer 60 are mounted on principal surface 91b of module board 91. Note that matching circuits 71 to 74 and coupler 80 are not illustrated in FIGS. 2A and 2B, but may be mounted on either of principal surfaces 91a and 91b of module board 91, or may be provided inside of module board 91. Note that coupler 80 monitors the power intensity of a radio frequency signal transferred in radio frequency module 1A, and outputs the power intensity to an external circuit such as RFIC 3 through coupler output terminal 180, and thus is desirably mounted on principal surface 91b that faces the motherboard.

In this example, reception low noise amplifier 21, switch 53, diplexer 60, and switch 55 are first circuit components disposed on reception paths AR and BR, and are mounted on principal surface 91b. On the other hand, switch 51 is mounted on principal surface 91a.

According to the above configuration, switch 51 is disposed on principal surface 91a of module board 91, and the first circuit components disposed on reception paths AR and BR are disposed on principal surface 91b. Stated differently, switch 51 and the first circuit components are disposed with module board 91 therebetween. Accordingly, when a high-power transmission signal of communication band A or B output from transmission power amplifier 11 is transferred through transmission path AT or BT, switch 51 can be prevented from being coupled with one or more circuit components disposed on at least one of reception path AR or BR via an electric field, a magnetic field, or an electromagnetic field. Thus, this can prevent a transmission signal of communication band A or B from flowing into the at least one of reception path AR or BR without passing through transmission filter 61T or 62T and switch 55. Further, harmonics that occur due to nonlinear operation of switch 51 and moreover, spurious waves due to intermodulation distortion caused by a transmission signal amplified by transmission power amplifier 11 and a transmission signal amplified by transmission power amplifier 12 can be prevented from sneaking into one or both of reception paths AR and BR. Accordingly, isolation of the transmission circuits from the reception circuits improves, and consequently this can reduce a decrease in reception sensitivity caused by the transmission signal, harmonics, and spurious waves due to intermodulation distortion sneaking into at least one of reception path AR or BR.

Furthermore, according to the above configuration, switch 52 is disposed on principal surface 91a of module board 91, and reception low noise amplifier 22 and switch 54 are disposed on principal surface 91b. Accordingly, when a high-power transmission signal of communication band A or B output from transmission power amplifier 11 or a high-power transmission signal of communication band C or D output from transmission power amplifier 12 is transferred through transmission path AT, BT, CT, or DT, at least one of switch 51 or 52 can be prevented from being coupled with one or more circuit components disposed on at least one of reception paths AR to DR via an electric field, a magnetic field, or an electromagnetic field. Thus, a transmission signal of communication band A, B, C, or D can be prevented from flowing into the at least one of reception paths AR to DR. Further, harmonics that occur due to nonlinear operation of switches 51 and 52 and moreover, spurious waves due to intermodulation distortion caused by a transmission signal amplified by transmission power amplifier 11 and a transmission signal amplified by transmission power amplifier 12 can be prevented from sneaking into one or more of reception paths AR to DR. Accordingly, this can reduce a decrease in reception sensitivity caused by the transmission signals, harmonics, and spurious waves due to intermodulation distortion sneaking into at least one of reception paths AR to DR.

Note that radio frequency module 1A according to this example has a configuration in which transmission power amplifiers 11 and 12, duplexers 61 to 64, switches 51 and 52, and matching circuits 31, 32, 41, and 42 are disposed on principal surface 91a, and reception low noise amplifiers 21 and 22, switches 53, 54, and 55, and diplexer 60 are disposed on principal surface 91b, yet at least one switch out of switches 51 and 52 may be disposed on principal surface 91a, and at least one component out of reception low noise amplifiers 21 and 22, switches 53, 54, and 55, and diplexer 60 may be disposed on principal surface 91b.

According to this, as compared with the radio frequency module having a configuration in which switches 51 and 52, reception low noise amplifiers 21 and 22, switches 53, 54, and 55, and diplexer 60 are disposed on the same principal surface, it is possible to reduce a decrease in reception sensitivity caused by the transmission signals, harmonics, and spurious waves due to intermodulation distortion sneaking into at least one of reception paths AR to DR.

In the radio frequency module according to the present disclosure, at least one of switch 51 or 52 is mounted on principal surface 91a, and at least one component (a first circuit component) out of the circuit components listed below may be mounted on principal surface 91b. Thus, the first circuit component may be at least one of:

(1) reception low noise amplifier 21 or 22

(2) the inductor of matching circuit 41 or the inductor of matching circuit 42

(3) switch 53 or 54

(4) one of reception filters 61R to 64R or one of duplexers 61 to 64

(5) diplexer 60

(6) switch 55

Note that desirably, module board 91 has a multilayer structure in which a plurality of dielectric layers are stacked, and a ground electrode pattern is formed on at least one of the dielectric layers. Accordingly, the electromagnetic field shielding function of module board 91 improves.

In radio frequency module 1A according to this example, a plurality of external-connection terminals 150 are disposed on principal surface 91b of module board 91. Radio frequency module 1A exchanges electrical signals with the motherboard disposed on the negative z-axis side of radio frequency module 1A, via external-connection terminals 150. Potential of some of external-connection terminals 150 are set to the ground potential of the motherboard. On principal surface 91b facing the motherboard out of principal surfaces 91a and 91b, transmission power amplifiers 11 and 12 whose height is not readily decreased are not disposed, and reception low noise amplifiers 21 and 22 and switches 53, 54, and 55 whose height is readily decreased are disposed, and thus the height of radio frequency module 1A as a whole can be decreased. Further, external-connection terminals 150 used as ground electrodes are disposed around reception low noise amplifiers 21 and 22 that greatly affect reception sensitivity of the reception circuits, and thus deterioration of reception sensitivity of the reception circuits can be reduced.

External-connection terminals 150 may be columnar electrodes passing through resin member 93 in the z-axis direction as illustrated in FIGS. 2A and 2B, or may be bump electrodes formed on principal surface 91b.

In radio frequency module 1A according to this example, transmission power amplifiers 11 and 12 are mounted on principal surface 91a.

Transmission power amplifiers 11 and 12 are components that generate a great amount of heat, out of circuit components included in radio frequency module 1A. In order to improve heat dissipation of radio frequency module 1A, it is important to dissipate heat generated by transmission power amplifiers 11 and 12 to the motherboard through heat dissipation paths having low heat resistance. If transmission power amplifiers 11 and 12 are mounted on principal surface 91b, electrode lines connected to transmission power amplifiers 11 and 12 are disposed on principal surface 91b. Accordingly, the heat dissipation paths include a heat dissipation path extending along only a planar line pattern (in the xy plane direction) on principal surface 91b. The planar line pattern is formed of a thin metal film, and thus has high heat resistance. Consequently, if transmission power amplifiers 11 and 12 are disposed on principal surface 91b, heat dissipation deteriorates.

In contrast, if transmission power amplifiers 11 and 12 are mounted on principal surface 91a, transmission power amplifiers 11 and 12 and external-connection terminals 150 can be connected via penetrating electrodes passing through module board 91 between principal surface 91a and principal surface 91b. Accordingly, as heat dissipation paths for transmission power amplifiers 11 and 12, a heat dissipation path extending along only a planar line pattern in the xy plane direction and having high heat resistance can be excluded from lines on and in module board 91. Thus, miniaturized radio frequency module 1A having improved heat dissipation from transmission power amplifiers 11 and 12 to the motherboard can be provided.

According to the above configuration that improves heat dissipation of radio frequency module 1A, external-connection terminals, for instance, intended to dissipate heat are disposed in the region of principal surface 91b in a position opposite transmission power amplifiers 11 and 12 in the z-axis direction, and thus the arrangement of circuit components is restricted. On the other hand, a high-power transmission signal flows through a transmission path that connects transmission power amplifier 11 and switch 51, and thus it is desirable to shorten the transmission path as much as possible. From this viewpoint, transmission power amplifier 11 and switch 51 are desirably disposed in opposite positions with module board 91 therebetween, yet it is difficult to dispose switch 51 and transmission power amplifier 11 in opposite positions due to the above restriction. Accordingly, it is desirable to mount switch 51 on principal surface 91a on which transmission power amplifier 11 is mounted, adjacently to transmission power amplifier 11.

Desirably, in a plan view of module board 91, switch 53 mounted on principal surface 91b and transmission power amplifier 11 mounted on principal surface 91a do not overlap, and switch 51 mounted on principal surface 91a and switch 53 mounted on principal surface 91b do not overlap.

Accordingly, not only switch 53 disposed on the reception paths and transmission power amplifier 11 are disposed with module board 91 therebetween, but also it can be ensured that switch 53 and transmission power amplifier 11 are widely spaced apart from each other. Furthermore, not only switch 53 disposed on the reception paths and switch 51 disposed on the transmission paths are disposed with module board 91 therebetween, but also it can be ensured that switch 53 and switch 51 are widely spaced apart from each other. Accordingly, isolation of the transmission circuits from the reception circuits further improves, and consequently this can further reduce a decrease in reception sensitivity caused by transmission signals, harmonics, and spurious waves due to intermodulation distortion sneaking into the reception paths.

As illustrated in radio frequency module 1A according to this example, the inductor of matching circuit 41 mounted on principal surface 91a and switch 53 mounted on principal surface 91b desirably overlap in a plan view of module board 91. Accordingly, the inductor of matching circuit 41 and switch 53 are in opposite positions with module board 91 therebetween, and thus the length of a line that connects the inductor of matching circuit 41 and switch 53 can be shortened. Consequently, the transfer loss in the reception paths can be decreased.

As illustrated in radio frequency module 1A according to this example, switch 53 mounted on principal surface 91b and at least one of duplexer 61 (or reception filter 61R) or duplexer 62 (or reception filter 62R) mounted on principal surface 91a desirably overlap in a plan view of module board 91. Accordingly, switch 53 and at least one of duplexer 61 or 62 are in opposite positions with module board 91 therebetween, and thus the length of a line that connects switch 53 and at least one of duplexer 61 or 62 can be shortened. Consequently, transfer loss in the reception paths can be decreased.

As illustrated in radio frequency module 1A according to this example, in a plan view of module board 91, transmission power amplifier 11, switch 51, and duplexer 61 (or transmission filter 61T) or duplexer 62 (or transmission filter 62T) are desirably disposed on principal surface 91a in this order. According to this, transmission power amplifier 11, switch 51, and duplexer 61 or 62 are disposed on principal surface 91a in the same order as an electrically connecting order. Accordingly, the length of a line that connects transmission power amplifier 11, switch 51, and duplexer 61 or 62 can be shortened. Thus, transfer loss in the transmission paths can be decreased.

Note that reception low noise amplifiers 21 and 22 and switches 53, 54, and 55 may be provided inside of one semiconductor IC 10. Accordingly, the height in the z-axis direction from principal surface 91b can be decreased, and the area for mounting components on principal surface 91b can be decreased. Thus, radio frequency module 1A can be miniaturized.

3. Arrangement of Circuit Elements of Radio Frequency Module 1C According to Variation 1

Figure 2C:
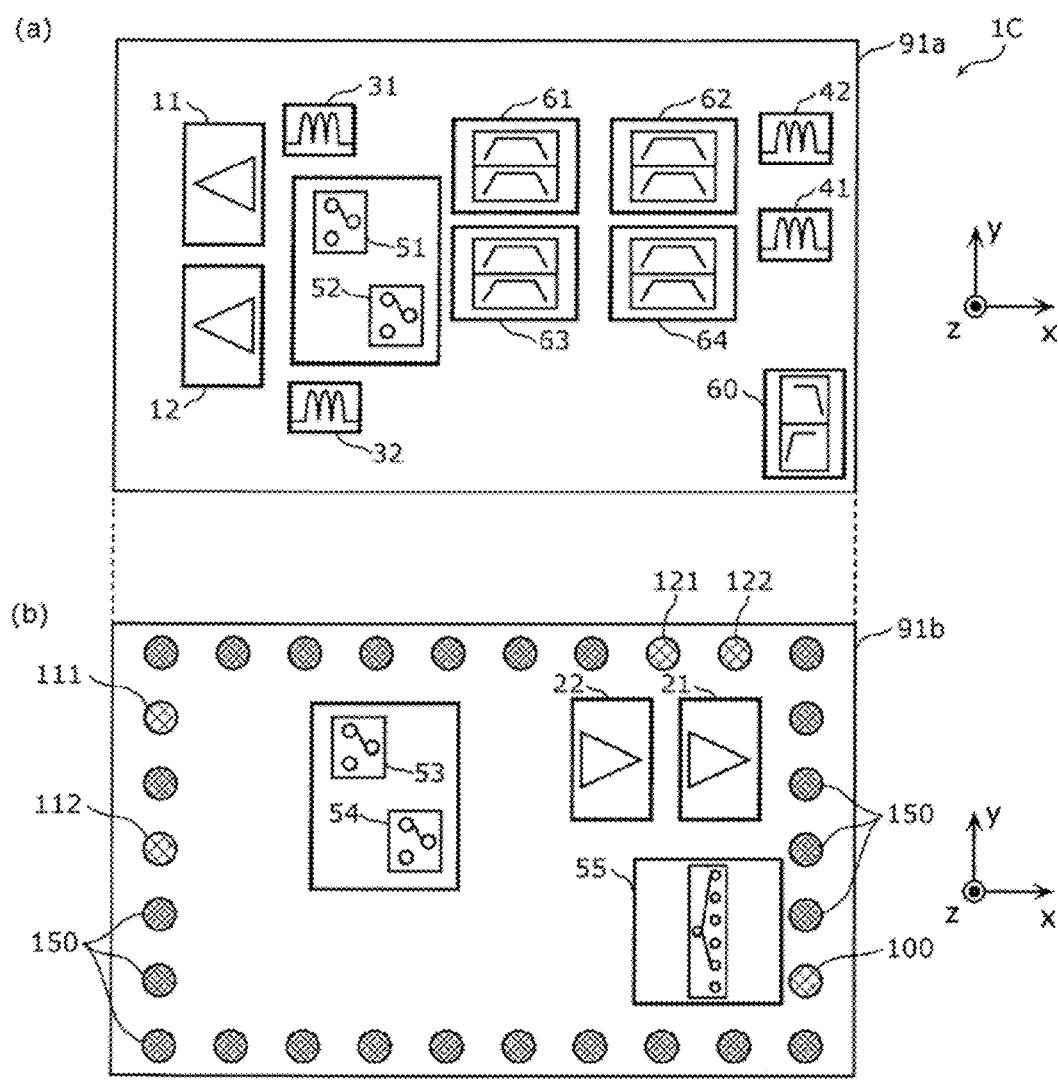
FIG. 2C is a schematic diagram illustrating a planar configuration of a radio frequency module according to Variation 1.

FIG. 2C is a schematic diagram illustrating a planar configuration of radio frequency module 1C according to Variation 1. Note that (a) of FIG. 2C illustrates a layout of circuit elements when principal surface 91a out of principal surfaces 91a and 91b on opposite sides of module board 91 is viewed from the positive z-axis. On the other hand, (b) of FIG. 2C is a perspective view of the layout of circuit elements when principal surface 91b is viewed from the positive z-axis.

Radio frequency module 1C according to Variation 1 shows a specific arrangement of circuit elements included in radio frequency module 1 according to the embodiment.

Radio frequency module 1C according to this variation is different from radio frequency module 1A according to Example 1, only in the arrangement of the circuit elements included in radio frequency module 1C. The following description of radio frequency module 1C according to this variation focuses on differences from radio frequency module 1A according to Example 1 while a description of the same points is omitted.

Module board 91 includes principal surface 91a (a first principal surface) and principal surface 91b (a second principal surface) on opposite sides of module board 91. As module board 91, for example, one of an LTCC board, an HTCC board, a component-embedded board, a board that includes an RDL, and a printed circuit board each having a stacked structure of a plurality of dielectric layers is used.

As illustrated in FIG. 2C, in radio frequency module 1C according to this variation, transmission power amplifiers 11 and 12, switches 51 and 52, duplexers 61 to 64, matching circuits 31, 32, 41, and 42, and diplexer 60 are mounted on principal surface 91a of module board 91. On the other hand, reception low noise amplifiers 21 and 22 and switches 53, 54, and 55 are mounted on principal surface 91b of module board 91. Note that although not illustrated in FIG. 2C, matching circuits 71 to 74 and coupler 80 may be mounted on either of principal surfaces 91a and 91b of module board 91, or may be provided inside of module board 91.

In this variation, reception low noise amplifiers 21 and 22 and switches 53, 54, and 55 are first circuit components disposed on reception paths AR to DR, and are mounted on principal surface 91b. On the other hand, switches 51 and 52 are mounted on principal surface 91a.

According to the above configuration, switches 51 and 52 and the first circuit components are disposed with module board 91 therebetween. Accordingly, when high-power transmission signals of communication bands A to D output from transmission power amplifiers 11 and 12 are transferred through transmission paths AT to DT, switches 51 and 52 can be prevented from being coupled with circuit components disposed on reception paths AR to DR via an electric field, a magnetic field, or an electromagnetic field. Thus, transmission signals of communication bands A to D can be prevented from flowing into any of reception paths AR to DR without passing through transmission filters 61T to 64T and switch 55. Further, harmonics that occur due to nonlinear operation of switches 51 and 52, and moreover, spurious waves due to intermodulation distortion caused by a transmission signal amplified by transmission power amplifier 11 and a transmission signal amplified by transmission power amplifier 12 can be prevented from sneaking into any of reception paths AR to DR. Accordingly, isolation of the transmission circuits from the reception circuits improves, and consequently this can reduce a decrease in reception sensitivity caused by the transmission signals, harmonics, and spurious waves due to intermodulation distortion sneaking into any of reception paths AR to DR.

In radio frequency module 1C according to this variation, external-connection terminals 150 are disposed on principal surface 91b of module board 91. Antenna connection terminal 100 is configured of one of external-connection terminals 150, and is formed in a position opposite diplexer 60 with module board 91 therebetween. This arrangement shortens the length of a line that connects antenna connection terminal 100 and diplexer 60, and thus transfer loss of transmission and reception signals transferred in radio frequency module 1C can be reduced. Transmission input terminals 111 and 112 are configured of two of external-connection terminals 150, and are formed in positions opposite transmission power amplifiers 11 and 12 with module board 91 therebetween. This arrangement shortens the length of a line that connects transmission input terminal 111 and transmission power amplifier 11 and the length of a line that connects transmission input terminal 112 and transmission power amplifier 12, and thus transfer loss of transmission signals transferred in radio frequency module 1C can be reduced. Reception output terminals 121 and 122 are configured of two of external-connection terminals 150, and are formed in positions adjacent to reception low noise amplifiers 21 and 22 on principal surface 91b. This arrangement shortens the length of a line that connects reception output terminal 121 and reception low noise amplifier 21, and the length of a line that connects reception output terminal 122 and reception low noise amplifier 22, and thus transfer loss of reception signals transferred in radio frequency module 1C can be reduced.

4. Arrangement of Circuit Elements of Radio Frequency Module 1D According to Variation 2

Figure 2D:
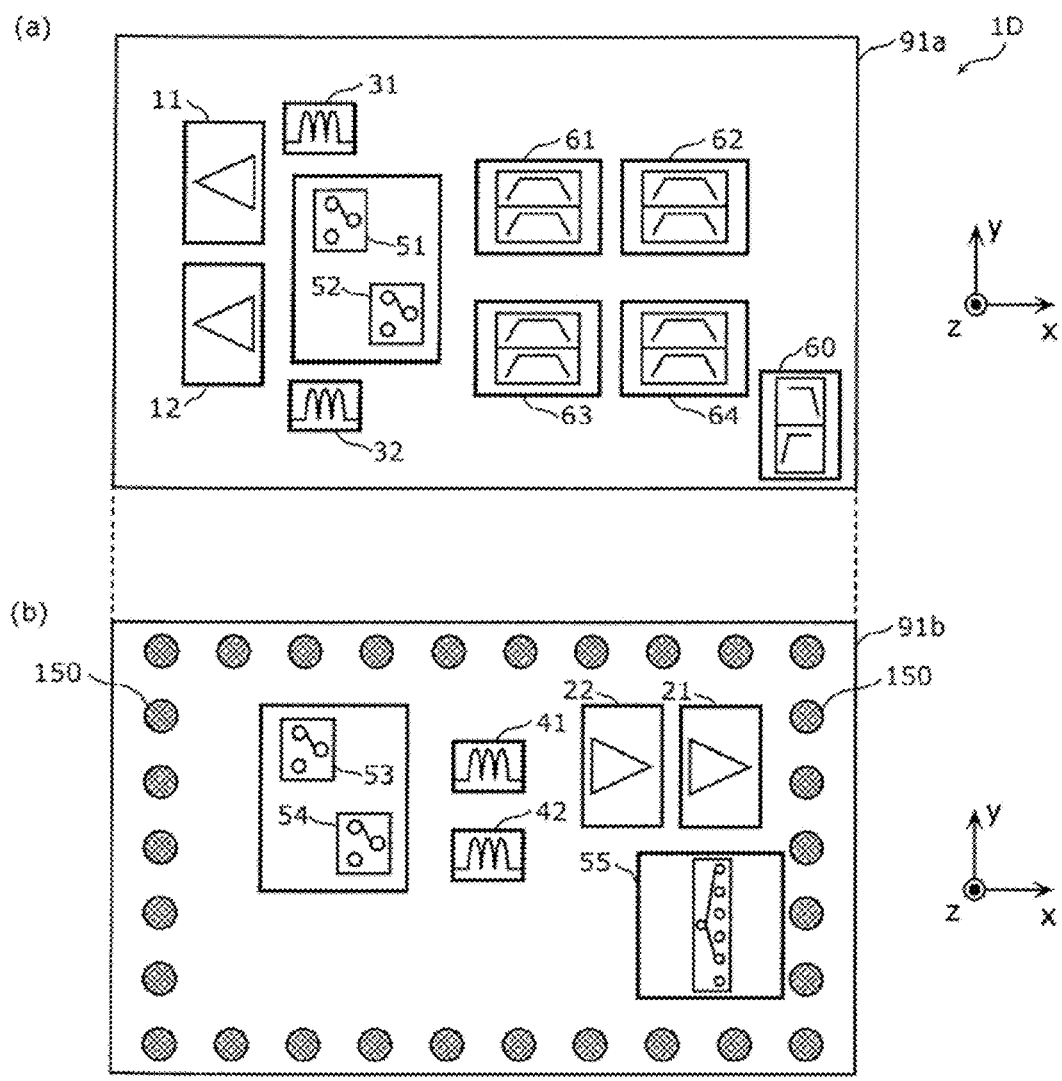
FIG. 2D is a schematic diagram illustrating a planar configuration of a radio frequency module according to Variation 2.

FIG. 2D is a schematic diagram illustrating a planar configuration of radio frequency module 1D according to Variation 2. Note that (a) of FIG. 2D illustrates a layout of circuit elements when principal surface 91a out of principal surfaces 91a and 91b on opposite sides of module board 91 is viewed from the positive z-axis. On the other hand, (b) of FIG. 2D is a perspective view of the layout of circuit elements when principal surface 91b is viewed from the positive z-axis.

Radio frequency module 1D according to Variation 2 shows a specific arrangement of circuit elements included in radio frequency module 1 according to the embodiment.

Radio frequency module 1D according to this variation is different from radio frequency module 1C according to Variation 1, only in the arrangement of matching circuits 41 and 42. The following description of radio frequency module 1D according to this variation focuses on differences from radio frequency module 1C according to Variation 1 while a description of the same points is omitted.

As illustrated in FIG. 2D, in radio frequency module 1D according to this variation, transmission power amplifiers 11 and 12, switches 51 and 52, duplexers 61 to 64, matching circuits 31 and 32, and diplexer 60 are mounted on principal surface 91a of module board 91. On the other hand, reception low noise amplifiers 21 and 22, matching circuits 41 and 42, and switches 53, 54, and 55 are mounted on principal surface 91b of module board 91.

In this variation, reception low noise amplifiers 21 and 22, matching circuits 41 and 42, and switches 53, 54, and 55 are first circuit components disposed on reception paths AR to DR, and are mounted on principal surface 91b. On the other hand, switches 51 and 52 are mounted on principal surface 91a.

The above configuration can prevent transmission signals of communication bands A to D from flowing into any of reception paths AR to DR without passing through transmission filters 61T to 64T and switch 55. Further, harmonics that occur due to nonlinear operation of switches 51 and 52, and moreover, spurious waves due to intermodulation distortion caused by a transmission signal amplified by transmission power amplifier 11 and a transmission signal amplified by transmission power amplifier 12 can be prevented from sneaking into any of reception paths AR to DR. Accordingly, isolation of the transmission circuits from the reception circuits improves, and consequently this can reduce a decrease in reception sensitivity caused by the transmission signals, harmonics, and spurious waves due to intermodulation distortion sneaking into any of reception paths AR to DR.

5. Arrangement of Circuit Elements of Radio Frequency Module 1E According to Variation 3

Figure 2E:
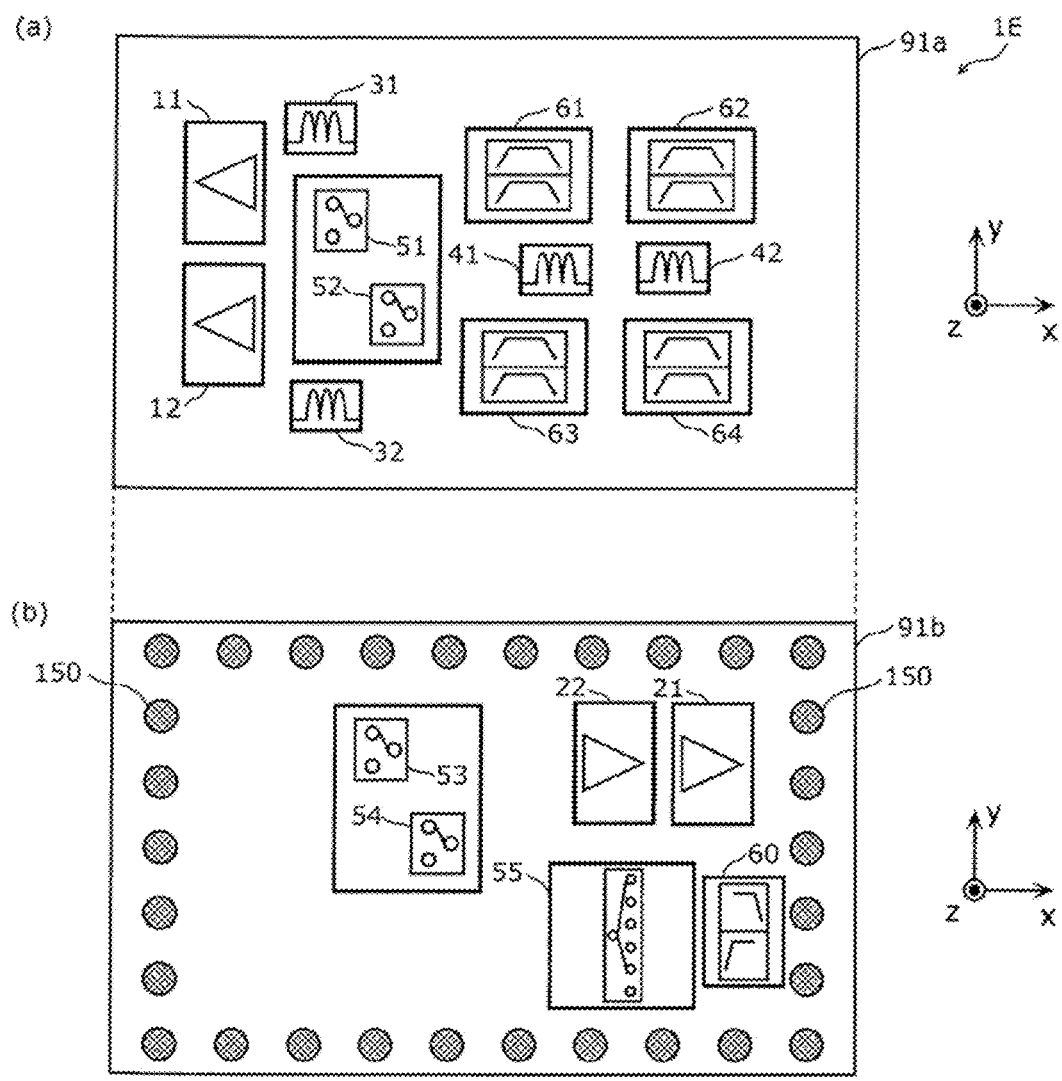
FIG. 2E is a schematic diagram illustrating a planar configuration of a radio frequency module according to Variation 3.

FIG. 2E is a schematic diagram illustrating a planar configuration of radio frequency module 1E according to Variation 3. Note that (a) of FIG. 2E illustrates a layout of circuit elements when principal surface 91a out of principal surfaces 91a and 91b on opposite sides of module board 91 is viewed from the positive z-axis. On the other hand, (b) of FIG. 2E is a perspective view of the layout of circuit elements when principal surface 91b is viewed from the positive z-axis.

Radio frequency module 1E according to Variation 3 shows a specific arrangement of circuit elements included in radio frequency module 1 according to the embodiment.

Radio frequency module 1E according to this variation is different from radio frequency module 1C according to Variation 1, in the arrangement of diplexer 60. The following description of radio frequency module 1E according to this variation focuses on differences from radio frequency module 1C according to Variation 1 while a description of the same points is omitted.

As illustrated in FIG. 2E, in radio frequency module 1E according to this variation, transmission power amplifiers 11 and 12, switches 51 and 52, duplexers 61 to 64, and matching circuits 31, 32, 41, and 42 are mounted on principal surface 91a of module board 91. On the other hand, reception low noise amplifiers 21 and 22, switches 53, 54, and 55, and diplexer 60 are mounted on principal surface 91b of module board 91.

In this variation, reception low noise amplifiers 21 and 22, switches 53, 54, and 55, and diplexer 60 are first circuit components disposed on reception paths AR to DR, and mounted on principal surface 91b. On the other hand, switches 51 and 52 are mounted on principal surface 91a.

According to the above configuration, the transmission signals of communication bands A to D can be prevented from flowing into any of reception paths AR to DR, without passing through transmission filters 61T to 64T and switch 55. Further, harmonics that occur due to nonlinear operation of switches 51 and 52, and moreover, spurious waves due to intermodulation distortion caused by a transmission signal amplified by transmission power amplifier and a transmission signal amplified by transmission power amplifier 12 can be prevented from sneaking into any of reception paths AR to DR. Accordingly, isolation of the transmission circuits from the reception circuits improves, and consequently this can reduce a decrease in reception sensitivity caused by the transmission signals, harmonics, and spurious waves due to intermodulation distortion sneaking into any of reception paths AR to DR.

6. Arrangement of Circuit Elements of Radio Frequency Module 1F According to Variation 4

Figure 2F:
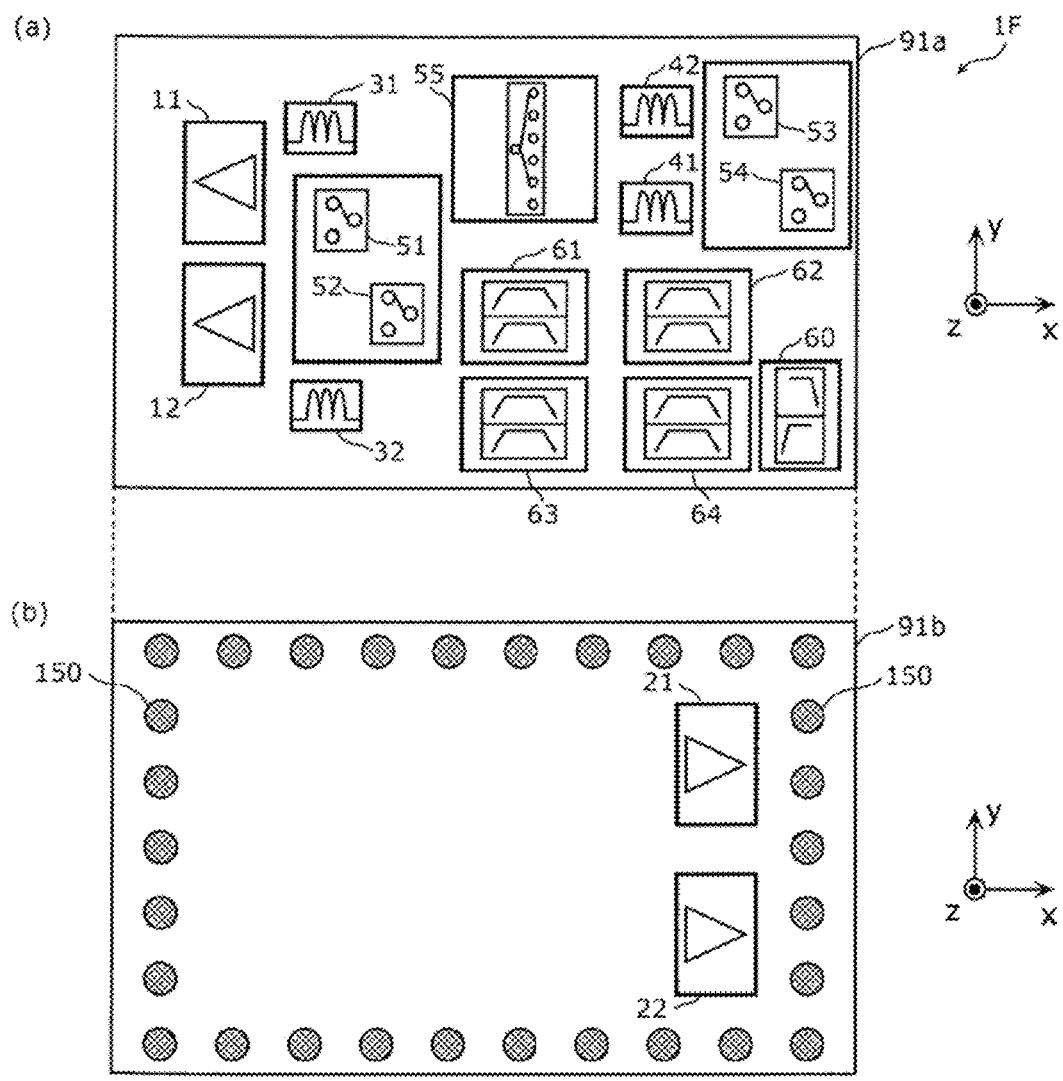
FIG. 2F is a schematic diagram illustrating a planar configuration of a radio frequency module according to Variation 4.

FIG. 2F is a schematic diagram illustrating a planar configuration of radio frequency module 1F according to Variation 4. Note that (a) of FIG. 2F illustrates a layout of circuit elements when principal surface 91a out of principal surfaces 91a and 91b on opposite sides of module board 91 is viewed from the positive z-axis. On the other hand, (b) of FIG. 2F is a perspective view of the layout of circuit elements when principal surface 91b is viewed from the positive z-axis.

Radio frequency module 1F according to Variation 4 shows a specific arrangement of circuit elements included in radio frequency module 1 according to the embodiment.

Radio frequency module 1F according to this variation is different from radio frequency module 1C according to Variation 1, in the arrangement of switches 53, 54, and 55. The following description of radio frequency module 1F according to this variation focuses on differences from radio frequency module 1C according to Variation 1 while a description of the same points is omitted.

As illustrated in FIG. 2F, in radio frequency module 1F according to this variation, transmission power amplifiers 11 and 12, switches 51 to 55, duplexers 61 to 64, matching circuits 31, 32, 41, and 42, and diplexer 60 are mounted on principal surface 91a of module board 91. On the other hand, reception low noise amplifiers 21 and 22 are mounted on principal surface 91b of module board 91.

In this variation, reception low noise amplifiers 21 and 22 are first circuit components disposed on reception paths AR to DR, and are mounted on principal surface 91b. On the other hand, switches 51 and 52 are mounted on principal surface 91a.

According to the above configuration, transmission signals of communication bands A to D can be prevented from flowing into any of reception paths AR to DR, without passing through transmission filters 61T to 64T and switch 55. Further, harmonics that occur due to nonlinear operation of switches 51 and 52, and moreover, spurious waves due to intermodulation distortion caused by a transmission signal amplified by transmission power amplifier 11 and a transmission signal amplified by transmission power amplifier 12 can be prevented from sneaking into any of reception paths AR to DR. Accordingly, isolation of the transmission circuits from the reception circuits improves, and consequently this can reduce a decrease in reception sensitivity caused by the transmission signals, harmonics, and spurious waves due to intermodulation distortion sneaking into any of reception paths AR to DR.

7. Arrangement of Circuit Elements of Radio Frequency Module 1B According to Example 2

Figure 3A:
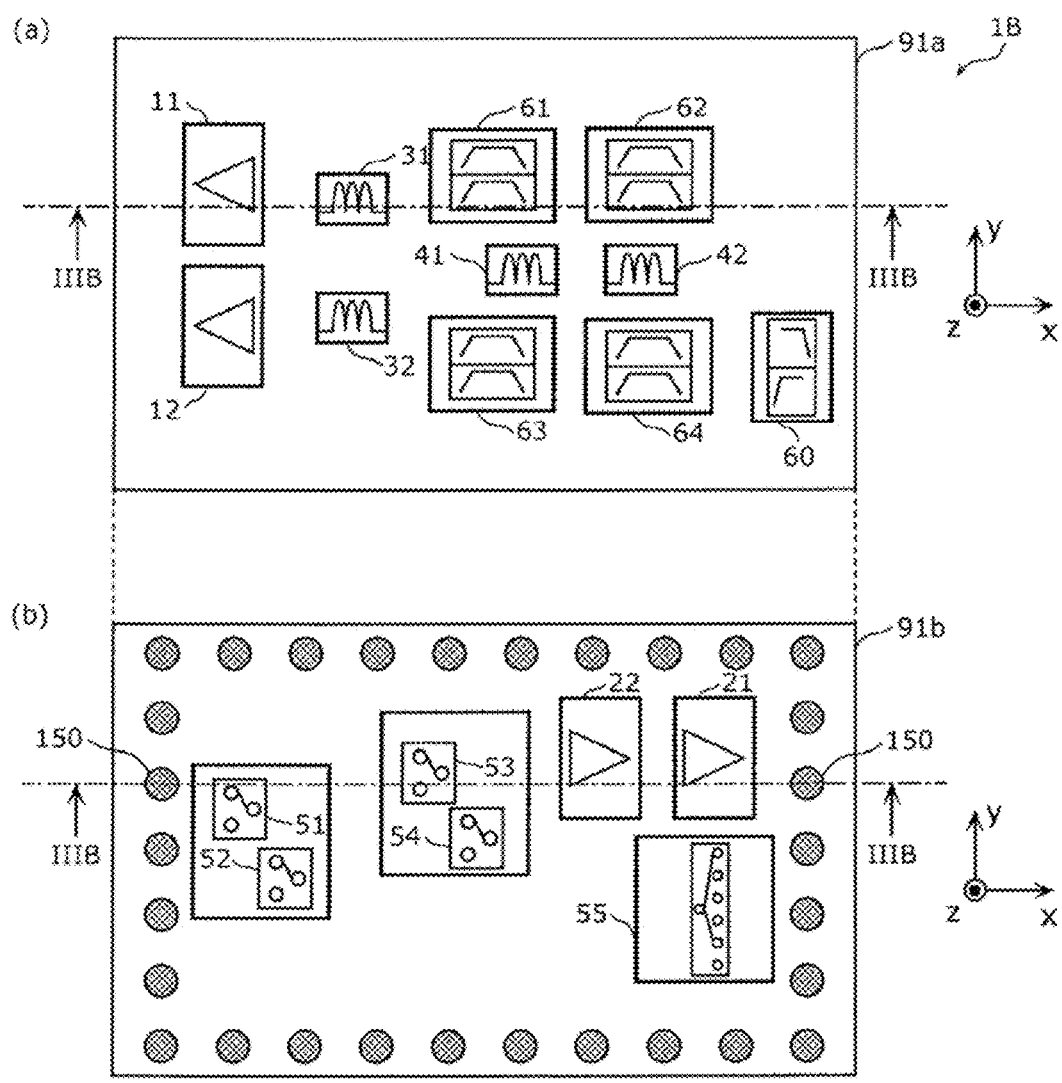
FIG. 3A is a schematic diagram illustrating a planar configuration of a radio frequency module according to Example 2.
Figure 3B:
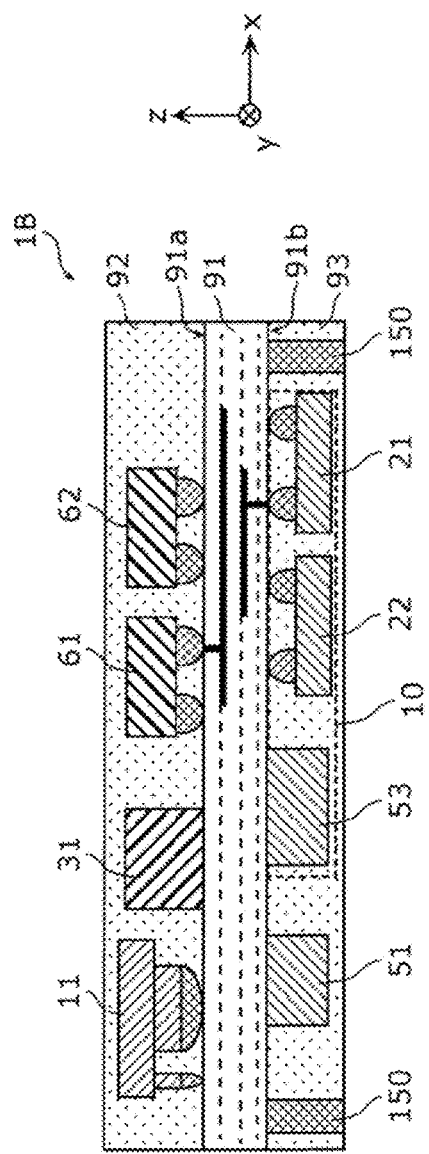
FIG. 3B is a schematic diagram illustrating a cross-sectional configuration of the radio frequency module according to Example 2.

FIG. 3A is a schematic diagram illustrating a planar configuration of radio frequency module 1B according to Example 2. FIG. 3B is a schematic diagram illustrating a cross-sectional configuration of radio frequency module 1B according to Example 2. Specifically, FIG. 3A illustrates a cross section taken along line IIIB to IIIB in FIG. 3A. Note that (a) of FIG. 3A illustrates a layout of circuit elements when principal surface 91a out of principal surfaces 91a and 91b on opposite sides of module board 91 is viewed from the positive z-axis. On the other hand, (b) of FIG. 3A is a perspective view of the layout of circuit elements when principal surface 91b is viewed from the positive z-axis.

Radio frequency module 1B according to Example 2 shows a specific arrangement of circuit elements included in radio frequency module 1 according to the embodiment.

Radio frequency module 1B according to this example is different from radio frequency module 1A according to Example 1, only in the arrangement of the circuit elements included in radio frequency module 1B. The following description of radio frequency module 1B according to this example focuses on differences from radio frequency module 1A according to Example 1 while a description of the same points is omitted.

Module board 91 includes principal surface 91a (a second principal surface) and principal surface 91b (a first principal surface) on opposite sides of module board 91. As module board 91, for example, one of an LTCC board, an HTCC board, a component-embedded board, a board that includes an RDL, and a printed circuit board each having a stacked structure of a plurality of dielectric layers is used.

As illustrated in FIGS. 3A and 3B, in radio frequency module 1B according to this example, transmission power amplifiers 11 and 12, duplexers 61 to 64, and matching circuits 31, 32, 41, and 42, and diplexer 60 are mounted on principal surface 91a of module board 91. On the other hand, reception low noise amplifiers 21 and 22 and switches 51, 52, 53, 54, and 55 are mounted on principal surface 91b of module board 91. Note that although not illustrated in FIGS. 3A and 3B, matching circuits 71 to 74 and coupler 80 may be mounted on either of principal surfaces 91a and 91b of module board 91 or may be provided inside of module board 91.

In this example, the inductor of matching circuit 41 and diplexer 60 are first circuit components disposed on reception paths AR and BR, and are mounted on principal surface 91a. On the other hand, switch 51 is mounted on principal surface 91b. Thus, switch 51 and the first circuit components are disposed with module board 91 therebetween.

According to the above configuration, switch 51 is disposed on principal surface 91b of module board 91, and the first circuit components disposed on reception paths AR and BR are disposed on principal surface 91a. Accordingly, when a high-power transmission signal of communication band A or B output from transmission power amplifier 11 transfers through transmission path AT or BT, switch 51 can be prevented from being coupled with one or more circuit components disposed on at least one of reception path AR or BR via an electric field, a magnetic field, or an electromagnetic field. Thus, a transmission signal of communication band A or B can be prevented from flowing into the at least one of reception path AR or BR without passing through transmission filter 61T or 62T and switch 55. Further, harmonics that occur due to nonlinear operation of switch 51, and moreover, spurious waves due to intermodulation distortion caused by a transmission signal amplified by transmission power amplifier 11 and a transmission signal amplified by transmission power amplifier 12 can be prevented from sneaking into one or both of reception paths AR and BR. Accordingly, isolation of the transmission circuits from the reception circuits improves, and consequently this can reduce a decrease in reception sensitivity caused by the transmission signals, harmonics, and spurious waves due to intermodulation distortion sneaking into at least one of reception path AR or BR.

Furthermore, according to the above configuration, switch 52 is disposed on principal surface 91b of module board 91, and the inductor of matching circuit 42 is disposed on principal surface 91a. Accordingly, when a high-power transmission signal of communication band A or B output from transmission power amplifier 11 or a high-power transmission signal of communication band C or D output from transmission power amplifier 12 is transferred through transmission path AT, BT, CT, or DT, at least one of switch 51 or 52 and one or more circuit components disposed on at least one of reception paths AR to DR can be prevented from being coupled via an electric field, a magnetic field, or an electromagnetic field. Thus, a transmission signal of communication band A, B, C, or D can be prevented from flowing into the at least one of reception paths AR to DR. Further, harmonics that occur due to nonlinear operation of switches 51 and 52, and moreover, spurious waves due to intermodulation distortion caused by a transmission signal amplified by transmission power amplifier 11 and a transmission signal amplified by transmission power amplifier 12 can be prevented from sneaking into one or more of reception paths AR to DR. Consequently, this can reduce a decrease in reception sensitivity caused by the transmission signals, harmonics, and spurious waves due to intermodulation distortion sneaking into at least one of reception paths AR to DR.

Note that in radio frequency module 1B according to this example, switches 51 and 52 are disposed on principal surface 91b, and the inductors of matching circuits 41 and 42, and diplexer 60 are disposed on principal surface 91a, yet the present disclosure is not limited thereto.

In the radio frequency module according to the present disclosure, at least one of switch 51 or 52 may be mounted on principal surface 91b, at least one of the circuit components listed in the following (the first circuit components) may be mounted on principal surface 91a. Thus, the first circuit component may be at least one of:

(1) the inductor of matching circuit 41 or the inductor of matching circuit 42

(2) diplexer 60

As shown by radio frequency module 1B according to this example, the inductor of matching circuit 41 mounted on principal surface 91a desirably overlaps switch 53 mounted on principal surface 91b, in a plan view of module board 91. Accordingly, the inductor of matching circuit 41 and switch 53 are in opposite positions with module board 91 therebetween, and thus the length of a line that connects the inductor of matching circuit 41 and switch 53 can be shortened. Consequently, transfer loss in reception paths can be reduced.

As shown by radio frequency module 1B according to this example, at least one of duplexer 61 (or reception filter 61R) or duplexer 62 (or reception filter 62R) mounted on principal surface 91a desirably overlaps switch 53 mounted on principal surface 91b in a plan view of module board 91. Accordingly, at least one of duplexer 61 or 62 and switch 53 are in opposite positions with module board 91 therebetween, and thus the length of a line that connects switch 53 and the at least one of duplexer 61 or 62 can be shortened. Consequently, transfer loss in a reception path can be reduced.

Note that reception low noise amplifiers 21 and 22 and switches 53, 54, and 55 may be provided inside of one semiconductor IC 10. Furthermore, switches 51 and 52 may be provided inside of semiconductor IC 10. Accordingly, the height in the z-axis direction from principal surface 91b can be reduced, and the area for mounting components on principal surface 91b can be decreased. Consequently, radio frequency module 1B can be miniaturized.

8. Circuit Configuration of Radio Frequency Module 1G and Communication Device 5G According to Example 3

Figure 4:
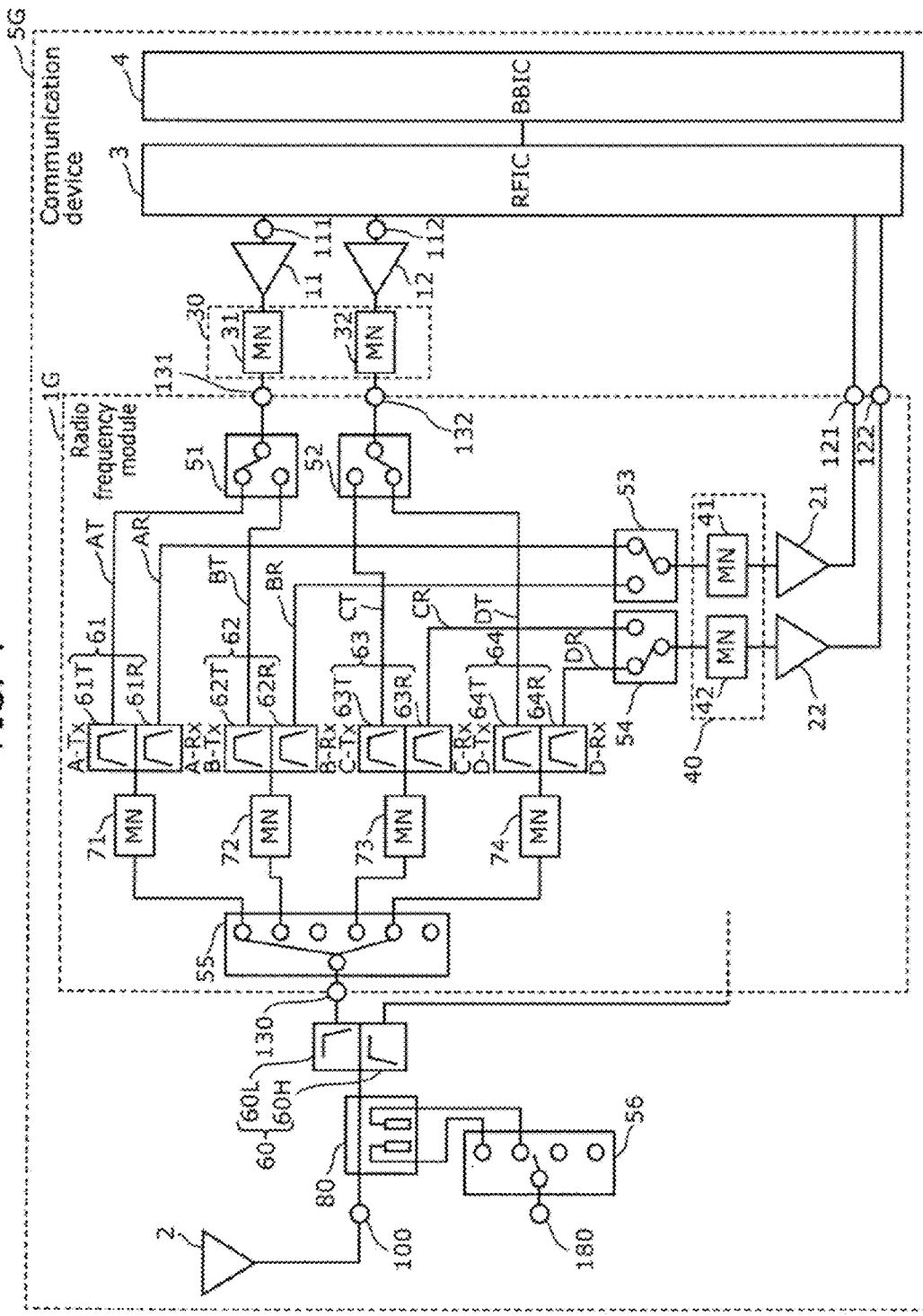
FIG. 4 illustrates a circuit configuration of a radio frequency module and a communication device according to Example 3.

FIG. 4 illustrates a circuit configuration of radio frequency module 1G and communication device 5G according to Example 3. As illustrated in FIG. 4, communication device 5G includes radio frequency module 1G, antenna connection terminal 100, antenna 2, transmission output matching circuit 30, transmission power amplifiers 11 and 12, transmission input terminals 111 and 112, diplexer 60, coupler 80, switch 56, coupler output terminal 180, RFIC 3, and BBIC 4. Communication device 5G illustrated in FIG. 4 is different from communication device 5 according to the embodiment in the circuit configuration of radio frequency module 1G. The following describes communication device 5G, focusing on the circuit configuration of radio frequency module 1G.

As illustrated in FIG. 4, radio frequency module 1G includes signal input/output terminal 130 (an input/output terminal), reception low noise amplifiers 21 and 22, transmission filters 61T, 62T, 63T, and 64T, reception filters 61R, 62R, 63R, and 64R, reception input matching circuit 40, matching circuits 71, 72, 73, and 74, and switches 51, 52, 53, 54, and 55. Radio frequency module 1G according to this example is different from radio frequency module 1 according to the embodiment in that transmission output matching circuit 30, transmission power amplifiers 11 and 12, diplexer 60, coupler 80, and switch 56 are not included. Thus, a main difference therefrom is that radio frequency module 1G does not include transmission power amplifiers 11 and 12.

Signal input terminal 131 is an example of a transmission input terminal, and is connected to an output terminal of transmission power amplifier 11 via matching circuit 31. Signal input terminal 132 is an example of a transmission input terminal, and is connected to an output terminal of transmission power amplifier 12 via matching circuit 32.

Switch 51 is an example of a first switch, and includes a common terminal, a first selection terminal, and a second selection terminal. The common terminal of switch 51 is connected to signal input terminal 131. The first selection terminal of switch 51 is connected to an end of transmission path AT, and the second selection terminal of switch 51 is connected to an end of transmission path BT. This connection configuration allows switch 51 to switch between connecting the common terminal to the first selection terminal and connecting the common terminal to the second selection terminal. Stated differently, switch 51 switches between connecting signal input terminal 131 to transmission path AT and connecting signal input terminal 131 to transmission path BT. The first selection terminal of switch 51 is connected to transmission filter 61T, and the second selection terminal of switch 51 is connected to transmission filter 62T. Thus, switch 51 switches between connecting signal input terminal 131 to transmission filter 61T and connecting signal input terminal 131 to transmission filter 62T. Switch 51 includes a single pole double throw (SPDT) switch circuit, for example.

Switch 52 includes a common terminal and two selection terminals. The common terminal of switch 52 is connected to signal input terminal 132. One selection terminal out of the selection terminals of switch 52 is connected to an end of transmission path CT, and the other selection terminal out of the selection terminals of switch 52 is connected to an end of transmission path DT. This connection configuration allows switch 52 to switch between connecting the common terminal to the one selection terminal and connecting the common terminal to the other selection terminal. Thus, switch 52 switches between connecting signal input terminal 132 to transmission path CT and connecting signal input terminal 132 to transmission path DT. Switch 52 includes an SPDT switch circuit, for example.

9. Arrangement of Circuit Elements of Radio Frequency Module 1G According to Example 3

Figure 5:
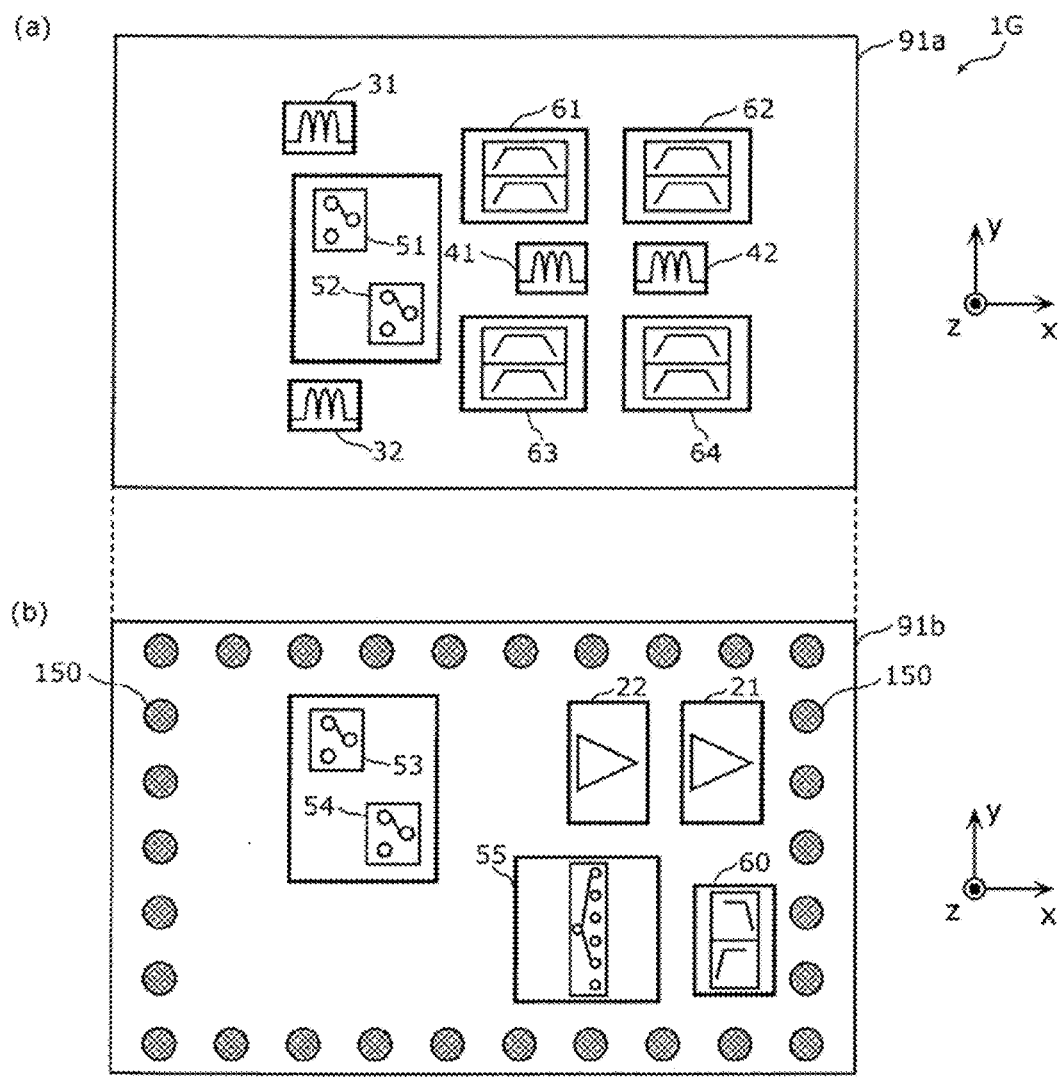
FIG. 5 is a schematic diagram illustrating a planar configuration of the radio frequency module according to Example 3.

FIG. 5 is a schematic diagram illustrating a planar configuration of radio frequency module 1G according to Example 3. Note that (a) of FIG. 5 illustrates a layout of circuit elements when principal surface 91a out of principal surfaces 91a and 91b on opposite sides of module board 91 is viewed from the positive z-axis. On the other hand, (b) of FIG. 5 is a perspective view of the layout of circuit elements when principal surface 91b is viewed from the positive z-axis.

Radio frequency module 1G according to this example is different from radio frequency module 1A according to Example 1, in that matching circuits 31 and 32 and transmission power amplifiers 11 and 12 are not included. The following describes the arrangement of circuit elements of radio frequency module 1G according to this example, focusing on differences from the arrangement of circuit elements of radio frequency module 1A according to Example 1.

As illustrated in FIG. 5, in radio frequency module 1G according to this example, duplexers 61 to 64, switches 51 and 52, and matching circuits 31, 32, 41, and 42 are mounted on principal surface 91a of module board 91. On the other hand, reception low noise amplifiers 21 and 22, switches 53, 54, and 55, and diplexer 60 are mounted on principal surface 91b of module board 91. Note that diplexer 60 is not an element of radio frequency module 1G, but may be disposed on the principal surface of module board 91 as illustrated in FIG. 5. Moreover, matching circuits 71 to 74 are not illustrated in FIG. 5, but may be mounted on either of principal surfaces 91a and 91b of module board 91 or may be provided inside of module board 91.

In this example, reception low noise amplifiers 21 and 22 and switches 53, 54, and 55 are first circuit components disposed on reception paths AR to DR, and are mounted on principal surface 91b. On the other hand, switches 51 and 52 are mounted on principal surface 91a.

According to the above configuration, switches 51 and 52 and the first circuit components are disposed with module board 91 therebetween. Accordingly, when high-power transmission signals of communication bands A to D input through signal input terminals 131 and 132 are transferred through transmission paths AT to DT, switch 51 or 52 and the circuit components disposed on reception paths AR to DR are prevented from being coupled with one another via an electric field, a magnetic field, or an electromagnetic field. Thus, the transmission signals of communication bands A to D can be prevented from flowing into any of reception paths AR to DR without passing through transmission filters 61T to 64T and switch 55. Further, harmonics that occur due to nonlinear operation of switches 51 and 52, and moreover, spurious waves due to intermodulation distortion caused by a transmission signal input through signal input terminal 131 and a transmission signal input through signal input terminal 132 can be prevented from sneaking into any of reception paths AR to DR. Accordingly, isolation of the transmission circuits from the reception circuits improves, and consequently this can reduce a decrease in reception sensitivity caused by the transmission signals, harmonics, and spurious waves due to intermodulation distortion sneaking into any of reception paths AR to DR.

10. Circuit Configuration of Radio Frequency Module 1H and Communication Device 5H According to Example 4

FIG. 6 illustrates a circuit configuration of radio frequency module 1H and communication device 5H according to Example 4. As illustrated in FIG. 6, communication device 5H includes radio frequency module 1H, antenna connection terminal 100, antenna 2, transmission output matching circuit 30, transmission power amplifiers 11 and 12, transmission input terminals 111 and 112, reception input matching circuit 40, reception low noise amplifiers 21 and 22, reception output terminals 121 and 122, diplexer 60, coupler 80, switch 56, coupler output terminal 180, RFIC 3, and BBIC 4. Communication device 5H illustrated in FIG. 6 is different from communication device 5G according to Example 3 in the circuit configuration of radio frequency module 1H. The following describes communication device 5H, focusing on the circuit configuration of radio frequency module 1H.

As illustrated in FIG. 6, radio frequency module 1H includes signal input/output terminal 130 (an input/output terminal), transmission filters 61T, 62T, 63T, and 64T, reception filters 61R, 62R, 63R, and 64R, matching circuits 71, 72, 73, and 74, and switches 51, 52, 53, 54, and 55. Radio frequency module 1H according to this example is different from radio frequency module 1G according to Example 3, in that reception input matching circuit 40 and reception low noise amplifiers 21 and 22 are not included. Thus, a main difference therefrom is that radio frequency module 1H does not include transmission power amplifiers 11 and 12 or reception low noise amplifiers 21 and 22.

Signal output terminal 141 is an example of a reception output terminal, and is connected to the input terminal of reception low noise amplifier 21 via matching circuit 41. Signal output terminal 142 is an example of a reception output terminal, and is connected to the input terminal of reception low noise amplifier 22 via matching circuit 42.

Switch 53 is an example of a second switch, and includes a common terminal, a third selection terminal, and a fourth selection terminal. The common terminal of switch 53 is connected to signal output terminal 141. The third selection terminal of switch 53 is connected to reception filter 61R disposed on reception path AR, and the fourth selection terminal of switch 53 is connected to reception filter 62R disposed on reception path BR. This connection configuration allows switch 53 to switch between connecting and disconnecting the common terminal to/from the third selection terminal, and switch between connecting and disconnecting the common terminal to/from the fourth selection terminal. Thus, switch 53 switches between connecting and disconnecting signal output terminal 141 to/from reception path AR, and switches between connecting and disconnecting signal output terminal 141 to/from reception path BR. Switch 53 includes an SPDT switch circuit, for example.

Switch 54 includes a common terminal and two selection terminals. The common terminal of switch 54 is connected to signal output terminal 142. One selection terminal out of the selection terminals of switch 54 is connected to reception filter 63R disposed on reception path CR, and the other selection terminal out of the selection terminals of switch 54 is connected to reception filter 64R disposed on reception path DR. This connection configuration allows switch 54 to switch between connecting and disconnecting the common terminal to/from the one selection terminal, and switches between connecting and disconnecting the common terminal to/from the other selection terminal. Thus, switch 54 switches between connecting and disconnecting signal output terminal 142 to/from reception path CR, and switches between connecting and disconnecting signal output terminal 142 to/from reception path DR. Switch 54 includes an SPDT switch circuit, for example.

11. Arrangement of Circuit Elements of Radio Frequency Module 1H According to Example 4

Figure 7A:
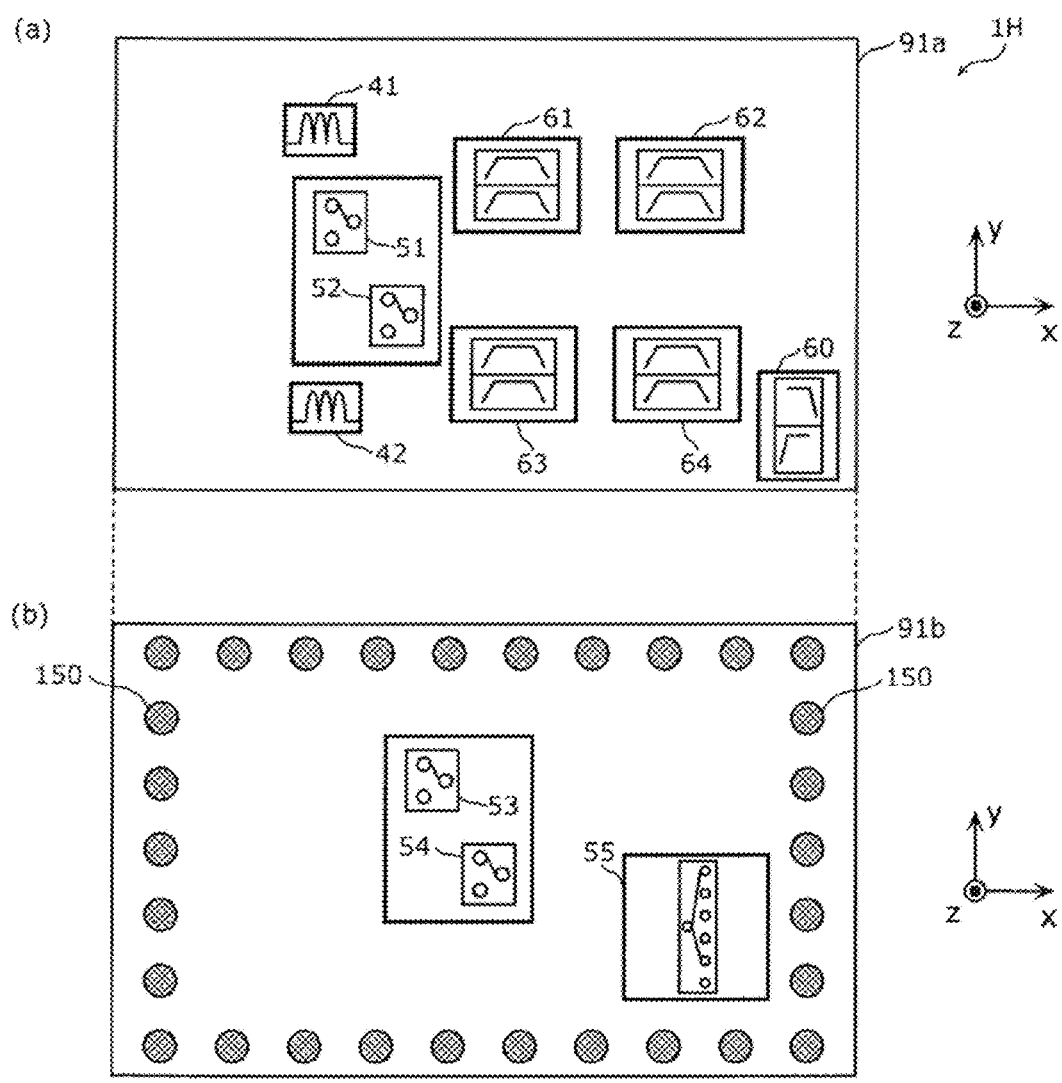
FIG. 7A is a schematic diagram illustrating a planar configuration of the radio frequency module according to Example 4.

FIG. 7A is a schematic diagram illustrating a planar configuration of radio frequency module 1H according to Example 4. Note that (a) of FIG. 7A illustrates a layout of circuit elements when principal surface 91a out of principal surfaces 91a and 91b on opposite sides of module board 91 is viewed from the positive z-axis. On the other hand, (b) of FIG. 7A is a perspective view of the layout of circuit elements when principal surface 91b is viewed from the positive z-axis.

Radio frequency module 1H according to this example is different from radio frequency module 1G according to Example 3, in that reception low noise amplifiers 21 and 22 are not included. The following describes the arrangement of circuit elements of radio frequency module 1H according to this example, focusing on differences from the arrangement of circuit elements of radio frequency module 1G according to Example 3.

As illustrated in FIG. 7A, in radio frequency module 1H according to this example, duplexers 61 to 64, switches 51 and 52, matching circuits 41 and 42, and diplexer 60 are mounted on principal surface 91a of module board 91. On the other hand, switches 53, 54, and 55 are mounted on principal surface 91b of module board 91. Note that diplexer 60 and matching circuits 41 and 42 are not elements of radio frequency module 1H, but may be disposed on the principal surface of module board 91 as illustrated in FIG. 7A. Although not illustrated in FIG. 7A, matching circuits 71 to 74 may be mounted on either of principal surfaces 91a and 91b of module board 91, or may be provided inside of module board 91.

In this example, switches 53, 54, and 55 are first circuit components disposed on reception paths AR to DR, and are mounted on principal surface 91b. On the other hand, switches 51 and 52 are mounted on principal surface 91a.

According to the above configuration, switches 51 and 52 and the first circuit components are disposed with module board 91 therebetween. Accordingly, when high-power transmission signals of communication bands A to D input through signal input terminals 131 and 132 are transferred through transmission paths AT to DT, switch 51 or 52 and the circuit components disposed on reception paths AR to DR can be prevented from being coupled with one another via an electric field, a magnetic field, or an electromagnetic field. Thus, transmission signals of communication bands A to D can be prevented from flowing into any of reception paths AR to DR without passing through transmission filters 61T to 64T and switch 55. Further, harmonics that occur due to nonlinear operation of switches 51 and 52, and moreover, spurious waves due to intermodulation distortion caused by a transmission signal input through signal input terminal 131 and a transmission signal input through signal input terminal 132 can be prevented from sneaking into any of reception paths AR to DR. Accordingly, isolation of the transmission circuits from the reception circuits improves, and consequently this can reduce a decrease in reception sensitivity caused by the transmission signals, harmonics, and spurious waves due to intermodulation distortion sneaking into any of reception paths AR to DR.

12. Arrangement of Circuit Elements of Radio Frequency Module 1J According to Variation 5

Figure 7B:
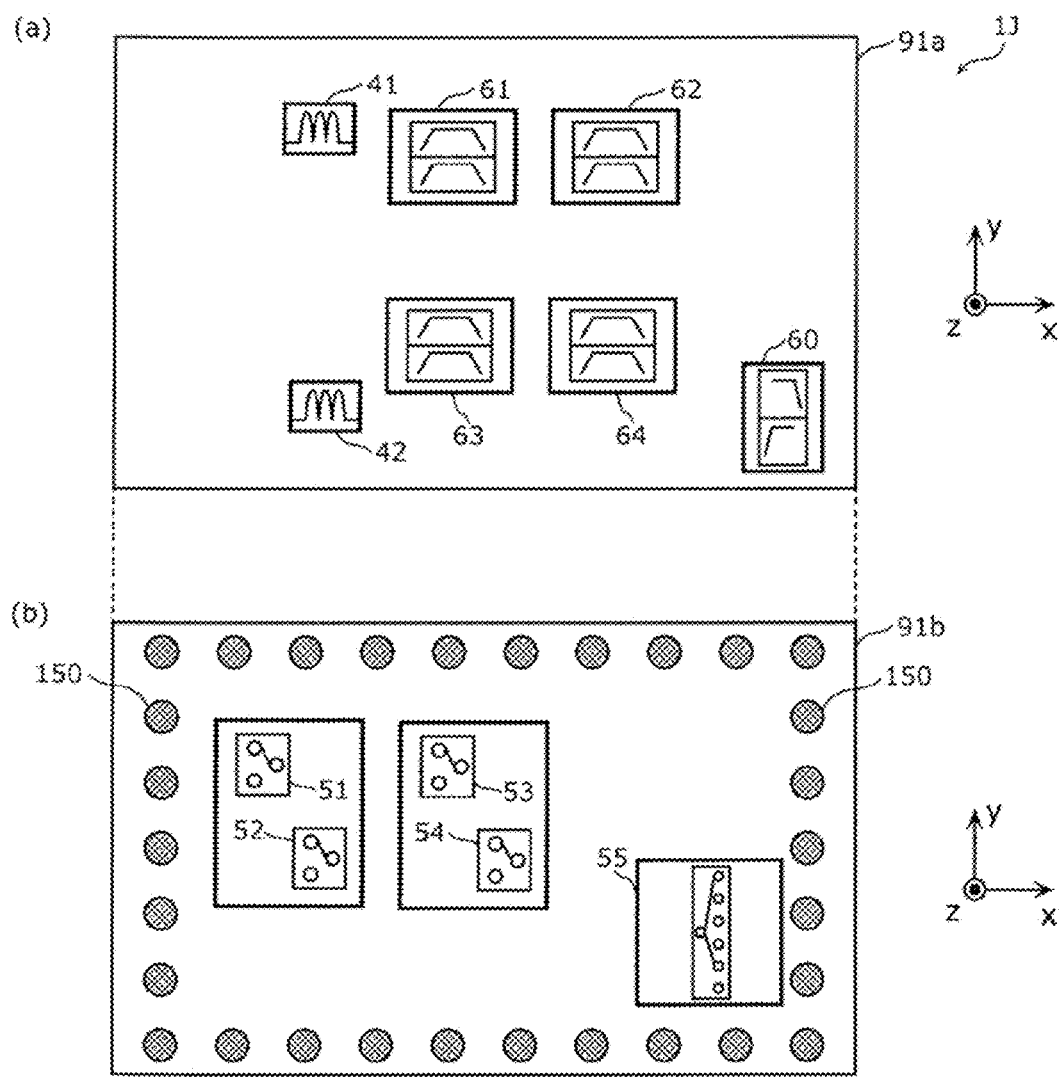
FIG. 7B is a schematic diagram illustrating a planar configuration of a radio frequency module according to Variation 5.

FIG. 7B is a schematic diagram illustrating a planar configuration of radio frequency module 1J according to Variation 5. Note that (a) of FIG. 7B illustrates a layout of circuit elements when principal surface 91a out of principal surfaces 91a and 91b on opposite sides of module board 91 is viewed from the positive z-axis. On the other hand, (b) of FIG. 7B is a perspective view of the layout of circuit elements when principal surface 91b is viewed from the positive z-axis.

Radio frequency module 1J according to this variation is different from radio frequency module 1H according to Example 4, in the arrangement of switches 51 and 52. The following describes the arrangement of circuit elements of radio frequency module 1J according to this variation, focusing on differences from the arrangement of circuit elements of radio frequency module 1H according to Example 4.

As illustrated in FIG. 7B, in radio frequency module 1J according to this variation, duplexers 61 to 64, matching circuits 41 and 42, and diplexer 60 are mounted on principal surface 91a of module board 91. On the other hand, switches 51, 52, 53, 54, and 55 are mounted on principal surface 91b of module board 91. Note that diplexer 60 and matching circuits 41 and 42 are not the elements of radio frequency module 1J, but may be disposed on the principal surface of module board 91 as illustrated in FIG. 7B. Although not illustrated in FIG. 7B, matching circuits 71 to 74 may be mounted on any of principal surfaces 91a and 91b of module board 91 or may be provided inside of module board 91.

In this example, duplexers 61 to 64, matching circuits 41 and 42, and diplexer 60 are first circuit components disposed on reception paths AR to DR, and are mounted on principal surface 91a. On the other hand, switches 51 and 52 are mounted on principal surface 91b.

According to the above configuration, switches 51 and 52 and the first circuit components are disposed with module board 91 therebetween. Accordingly, when high-power transmission signals of communication bands A to D input through signal input terminals 131 and 132 are transferred through transmission paths AT to DT, switch 51 or 52 and the circuit components disposed on reception paths AR to DR can be prevented from being coupled with one another via an electric field, a magnetic field, or an electromagnetic field. Thus, transmission signals of communication bands A to D can be prevented from flowing into any of reception paths AR to DR without passing through transmission filters 61T to 64T and switch 55. Further, harmonics that occur due to nonlinear operation of switches 51 and 52, and moreover, spurious waves due to intermodulation distortion caused by a transmission signal input through signal input terminal 131 and a transmission signal input through signal input terminal 132 can be prevented from sneaking into any of reception paths AR to DR. Accordingly, isolation of the transmission circuits from the reception circuits improves, and consequently this can reduce a decrease in reception sensitivity caused by the transmission signals, harmonics, and spurious waves due to intermodulation distortion sneaking into any of reception paths AR to DR.

13. Arrangement of Circuit Elements of Radio Frequency Module 1K According to Variation 6

Figure 7C:
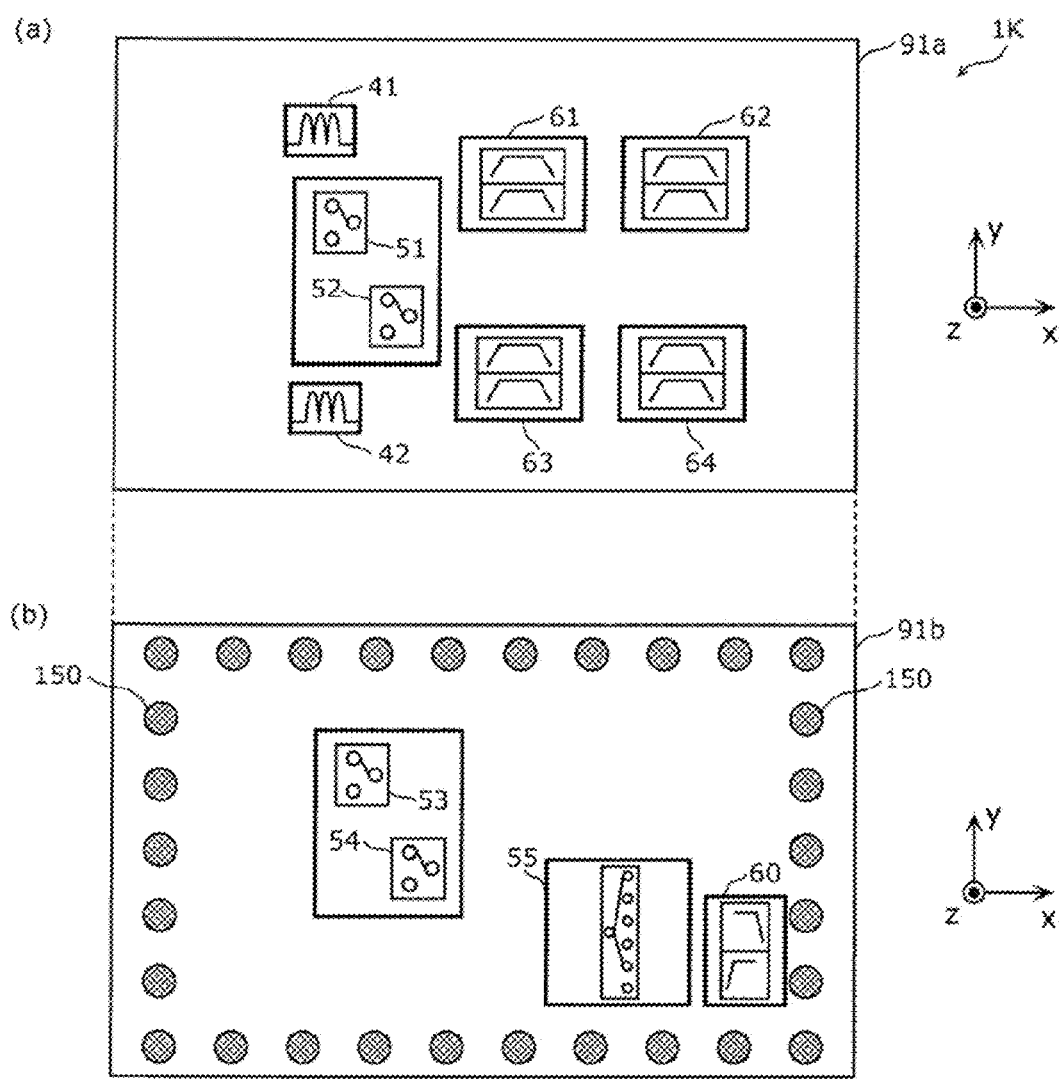
FIG. 7C is a schematic diagram illustrating a planar configuration of a radio frequency module according to Variation 6.

FIG. 7C is a schematic diagram illustrating a planar configuration of radio frequency module 1K according to Variation 6. Note that (a) of FIG. 7C illustrates a layout of circuit elements when principal surface 91a out of principal surfaces 91a and 91b on opposite sides of module board 91 is viewed from the positive z-axis. On the other hand, (b) of FIG. 7C is a perspective view of the layout of circuit elements when principal surface 91b is viewed from the positive z-axis.

Radio frequency module 1K according to this variation is different from radio frequency module 1H according to Example 4, in the arrangement of diplexer 60. The following describes the arrangement of circuit elements of radio frequency module 1K according to this variation, focusing on differences from the arrangement of circuit elements of radio frequency module 1H according to Example 4.

As illustrated in FIG. 7C, in radio frequency module 1K according to this variation, switches 51 and 52, duplexers 61 to 64, and matching circuits 41 and 42 are mounted on principal surface 91a of module board 91. On the other hand, switches 53, 54, and 55, and diplexer 60 are mounted on principal surface 91b of module board 91. Note that diplexer 60 and matching circuits 41 and 42 are not elements of radio frequency module 1K, but may be disposed on the principal surface of module board 91 as illustrated in FIG. 7C. Although not illustrated in FIG. 7C, matching circuits 71 to 74 may be mounted on either of principal surfaces 91a and 91b of module board 91 or may be provided inside of module board 91.

In this variation, switches 53, 54, and 55 and diplexer 60 are first circuit components disposed on reception paths AR to DR, and are mounted on principal surface 91b. On the other hand, switches 51 and 52 are mounted on principal surface 91a.

According to the above configuration, switches 51 and 52 and the first circuit components are disposed with module board 91 therebetween. Accordingly, when high-power transmission signals of communication bands A to D input through signal input terminals 131 and 132 are transferred through transmission paths AT to DT, switch 51 or 52 and the circuit components disposed on reception paths AR to DR can be prevented from being coupled with one another via an electric field, a magnetic field, or an electromagnetic field. Thus, transmission signals of communication bands A to D can be prevented from flowing into any of reception paths AR to DR without passing through transmission filters 61T to 64T and switch 55. Further, harmonics that occur due to nonlinear operation of switches 51 and 52, and moreover, spurious waves due to intermodulation distortion caused by a transmission signal input through signal input terminal 131 and a transmission signal input through signal input terminal 132 can be prevented from sneaking into any of reception paths AR to DR. Accordingly, isolation of the transmission circuits from the reception circuits improves, and consequently this can reduce a decrease in reception sensitivity caused by the transmission signals, harmonics, and spurious waves due to intermodulation distortion sneaking into any of reception paths AR to DR.

14. Advantageous Effects and Others

As described above, radio frequency module 1 according to the present embodiment includes: module board 91 that includes principal surface 91a and principal surface 91b on opposite sides of module board 91; transmission input terminal 111; reception output terminal 121; antenna connection terminal 100; switch 51 that includes: a common terminal connected to a first common transmission path connected to transmission input terminal 111; a first selection terminal connected to transmission path AT connected to antenna connection terminal 100; and a second selection terminal connected to transmission path BT connected to antenna connection terminal 100, switch 51 being configured to switch between connecting the common terminal to the first selection terminal and connecting the common terminal to the second selection terminal; transmission power amplifier 11 disposed on the first common transmission path; and one or more first circuit components disposed on reception path AR or BR connected to reception output terminal 121 and antenna connection terminal 100. Transmission path AT is a signal path through which a transmission signal of communication band A is transferred, transmission path BT is a signal path through which a transmission signal of communication band B is transferred, switch 51 is disposed on principal surface 91a, and at least one of the one or more first circuit components is disposed on principal surface 91b.

Accordingly, when a high-power transmission signal of communication band A or B output from transmission power amplifier 11 is transferred through transmission path AT or BT, switch 51 and one or more circuit components disposed on at least one of reception path AR or BR can be prevented from being coupled with each other via an electric field, a magnetic field, or an electromagnetic field. Thus, a transmission signal of communication band A or B can be prevented flowing into the at least one of reception path AR or BR without passing through transmission filter 61T or 62T and switch 55. Further, harmonics that occur due to nonlinear operation of switch 51, and moreover, spurious waves due to intermodulation distortion caused by a transmission signal amplified by transmission power amplifier 11 and a transmission signal amplified by transmission power amplifier 12 can be prevented from sneaking into one or both of reception paths AR and BR. Accordingly, isolation of the transmission circuits from the reception circuits improves, and consequently this can reduce a decrease in reception sensitivity caused by the transmission signals, harmonics, and spurious waves due to intermodulation distortion sneaking into at least one of reception path AR or BR.

The one or more first circuit components may include at least one of: reception low noise amplifier 21; an inductor of matching circuit 41 connected to an input terminal of reception low noise amplifier 21; switch 53 configured to switch between connecting reception paths AR and BR to reception low noise amplifier 21 and disconnecting reception paths AR and BR from reception low noise amplifier 21; reception filter 61R or 62R or duplexer 61 or 62; filter 60L that includes at least one of an inductor or a capacitor; or switch 55 connected to antenna connection terminal 100 or filter 60L, switch 55 being configured to switch among connecting transmission path AT to antenna connection terminal 100, connecting transmission path BT to antenna connection terminal 100, connecting reception path AR to antenna connection terminal 100, and connecting reception path BR to antenna connection terminal 100.

External-connection terminal 150 connected to a motherboard may be disposed on principal surface 91b.

According to this, receiver circuit components whose height is readily reduced are disposed on principal surface 91b that faces the motherboard, and thus the height of radio frequency module 1 as a whole can be reduced. Further, external-connection terminals 150 used as ground electrodes are disposed around the receiver circuit components that greatly affect reception sensitivity, and thus deterioration of reception sensitivity of reception circuits can be reduced.

Transmission power amplifier 11 may be mounted on principal surface 91a.

Accordingly, as a heat dissipation path for transmission power amplifier 11, a heat dissipation path extending along only a planar line pattern having high heat resistance can be excluded from lines on and in module board 91. Thus, miniaturized radio frequency module 1 having improved heat dissipation from transmission power amplifier 11 to the motherboard can be provided.

It is desirable that radio frequency module 1 further includes: reception low noise amplifier 21, one of the one or more first circuit components is switch 53 configured to switch between connecting reception paths AR and BR to reception low noise amplifier 21 and disconnecting reception paths AR and BR from reception low noise amplifier 21, switch 53 is disposed on principal surface 91b, and in a plan view of module board 91, transmission power amplifier 11 and switch 53 do not overlap, and switch 51 and switch 53 do not overlap.

Accordingly, not only switch 53 disposed on reception paths and transmission power amplifier 11 are in opposite positions with module board 91 therebetween, but also it can be ensured that switch 53 and transmission power amplifier 11 are widely spaced apart from each other. Further, not only switch 53 disposed on reception paths and switch 51 disposed on transmission paths are in opposite positions with module board 91 therebetween, but also it can be ensured that switch 53 and switch 51 are widely spaced apart from each other. Accordingly, the isolation between a transmission circuit and a reception circuit further improves, and consequently this can reduce a decrease in reception sensitivity caused by transmission signals, harmonics, and spurious waves due to intermodulation distortion sneaking into reception paths.

It is desirable that radio frequency module 1 further includes: reception low noise amplifier 21; and at least one of (i) an inductor of matching circuit 41 connected to an input terminal of reception low noise amplifier 21 or (ii) one of reception filter 61R and duplexer 61, one of the one or more first circuit components is switch 53 configured to switch between connecting reception low noise amplifier 21 to reception paths AR and BR and disconnecting reception low noise amplifier 21 from reception paths AR and BR, the at least one of the inductor of matching circuit 41 or the one of reception filter 61R and duplexer 61 is disposed on principal surface 91a, switch 53 is disposed on principal surface 91b, and in a plan view of module board 91, switch 53 and the one of reception filter 61R and duplexer 61 overlap.

Accordingly, reception filter 61R or duplexer 61 and switch 53 are in opposite positions with module board 91 therebetween. Thus, the length of a line that connects reception filter 61R or duplexer 61 and switch 53 can be shortened. Consequently, transfer loss in the reception path can be reduced.

It is desirable that radio frequency module 1 further includes: one of transmission filter 61T connected to switch 51 and duplexer 61 connected to switch 51, and the one of transmission filter 61T and duplexer 61 is mounted on principal surface 91a, and in a plan view of module board 91, transmission power amplifier 11, switch 51, and the one of transmission filter 61T and duplexer 61 are disposed on principal surface 91a in a stated order.

Accordingly, transmission power amplifier 11, switch 51, and transmission filter 61T or duplexer 61 are disposed on principal surface 91a in the same order as an electrically connecting order, and thus the length of a line that connects transmission power amplifier 11, switch 51, and transmission filter 61T or duplexer 61 can be shortened. Consequently, transfer loss in the transmission path can be reduced.

Radio frequency module 1 may further include: reception low noise amplifier 21, and the one or more first circuit components include at least one of (i) an inductor of matching circuit 41 connected to an input terminal of reception low noise amplifier 21 or (ii) filter 60L, external-connection terminal 150 is disposed on principal surface 91b, switch 51 is disposed on principal surface 91b, and the at least one of the inductor of matching circuit 41 or filter 60L is disposed on principal surface 91a.

Accordingly, when a high-power transmission signal of communication band A or B output from transmission power amplifier 11 is transferred through transmission path AT or BT, switch 51 and one or more circuit components disposed on at least one of reception path AR or BR can be prevented from being coupled with each other via an electric field, a magnetic field, or an electromagnetic field. Thus, a transmission signal of communication band A or B can be prevented from flowing into the at least one of reception path AR or BR without passing through transmission filter 61T or 62T and switch 55. Further, harmonics that occur due to nonlinear operation of switch 51, and moreover, spurious waves due to intermodulation distortion caused by a transmission signal amplified by transmission power amplifier 11 and a transmission signal amplified by transmission power amplifier 12 can be prevented from sneaking into one or both of reception paths AR and BR. Consequently, isolation between a transmission circuit and a reception circuit improves, thus reducing deterioration in reception sensitivity.

Radio frequency module 1 includes: module board 91 that includes principal surface 91a and principal surface 91b on opposite sides of module board 91; transmission input terminal 111; reception output terminal 121; antenna connection terminal 100; transmission power amplifier 11 connected to transmission input terminal 111; transmission filter 61T connected to antenna connection terminal 100; transmission filter 62T connected to antenna connection terminal 100; switch 51 that includes: a common terminal connected to an output terminal of transmission power amplifier 11; a first selection terminal connected to first transmission filter 61T; and a second selection terminal connected to transmission filter 62T, switch 51 being configured to switch between connecting the common terminal to the first selection terminal and connecting the common terminal to the second selection terminal; and one or more first circuit components connected to reception output terminal 121 and antenna connection terminal 100. Switch 51 is disposed on principal surface 91a, and at least one of the one or more first circuit components is disposed on principal surface 91b.

Accordingly, when a high-power transmission signal output from transmission power amplifier 11 is transferred through a transmission path on which transmission filters 61T and 62T are disposed, switch 51 and the one or more first circuit components can be prevented from being coupled with one another via an electric field, a magnetic field, or an electromagnetic field. Thus, the transmission signal or harmonics thereof can be prevented from sneaking into the one or more first circuit components without passing through circuit components disposed on a transmission path such as transmission filter 61T or 62T. Further, harmonics that occur due to nonlinear operation of switch 51, and moreover, spurious waves due to intermodulation distortion caused by a transmission signal amplified by transmission power amplifier 11 and a transmission signal amplified by transmission power amplifier 12 can be prevented from flowing into the one or more first circuit components. Accordingly, isolation between a transmission circuit and a reception circuit improves, and consequently this can reduce a decrease in reception sensitivity caused by the transmission signal, harmonics, and spurious waves due to intermodulation distortion sneaking into the reception path.

Radio frequency module 1 may include: duplexer 61 that includes: a first common terminal connected to antenna connection terminal 100; transmission filter 61T connected to the first common terminal; and reception filter 61R connected to the first common terminal; and duplexer 62 that includes: a second common terminal connected to antenna connection terminal 100; transmission filter 62T connected to the second common terminal; and reception filter 62R connected to the second common terminal. Reception filter 61R may be one of the one or more first circuit components, and reception filter 62R may be one of the one or more first circuit components.

Accordingly, when high-power transmission signals output from transmission power amplifier 11 are transferred through transmission paths on which transmission filters 61T and 62T are disposed, switch 51 and the one or more first circuit components can be prevented from being coupled with one another via an electric field, a magnetic field, or an electromagnetic field. Consequently, isolation between a transmission circuit and a reception circuit improves, so that this can reduce a decrease in reception sensitivity caused by the transmission signals, harmonics, and spurious waves due to intermodulation distortion sneaking into a reception path.

Radio frequency module 1G includes: module board 91 that includes principal surface 91a and principal surface 91b on opposite sides of module board 91; transmission input terminal 131; reception output terminal 121; antenna connection terminal 100; transmission filter 61T connected to antenna connection terminal 100; transmission filter 62T connected to antenna connection terminal 100; switch 51 that includes: a common terminal connected to transmission input terminal 131; a first selection terminal connected to transmission filter 61T; and a second selection terminal connected to transmission filter 62T, switch 51 being configured to switch between connecting the common terminal to the first selection terminal and connecting the common terminal to the second selection terminal; and one or more first circuit components connected to reception path AR or BR connected to reception output terminal 121 and antenna connection terminal 100. Switch 51 is disposed on principal surface 91a, and at least one of the one or more first circuit components is disposed on principal surface 91b.

According to this, switch 51 and the one or more first circuit components are disposed with module board 91 therebetween. Thus, when high-power transmission signals input through signal input terminal 131 are transferred through transmission paths on which transmission filters 61T and 62T are disposed, switch 51 and the one or more first circuit components can be prevented from being coupled with one another via an electric field, a magnetic field, or an electromagnetic field. Accordingly, the transmission signals or harmonics thereof can be prevented from sneaking into the one or more first circuit components without passing through circuit components disposed on transmission paths such as transmission filters 61T and 62T. Further, harmonics that occur due to nonlinear operation of switch 51, and moreover, spurious waves due to intermodulation distortion caused by a transmission signal input through signal input terminal 131 and a transmission signal input through signal input terminal 132 can be prevented from sneaking into the one or more first circuit components. Consequently, isolation between a transmission circuit and a reception circuit improves, so that this can reduce a decrease in reception sensitivity caused by the transmission signals, harmonics, and spurious waves due to intermodulation distortion sneaking into reception paths.

Radio frequency module 1G may include: duplexer 61 that includes: a first common terminal connected to antenna connection terminal 100; transmission filter 61T connected to the first common terminal; and reception filter 61R connected to the first common terminal; and duplexer 62 that includes: a second common terminal connected to antenna connection terminal 100; transmission filter 62T connected to the second common terminal; and reception filter 62R connected to the second common terminal. Reception filter 61R may be one of the one or more first circuit components, and reception filter 62R may be one of the one or more first circuit components.

Accordingly, when high-power transmission signals output through signal input terminal 131 are transferred through transmission paths on which transmission filters 61T and 62T are disposed, switch 51 and the one or more first circuit components can be prevented from being coupled with one another via an electric field, a magnetic field, or an electromagnetic field. Consequently, isolation between a transmission circuit and a reception circuit improves, so that this can reduce a decrease in reception sensitivity caused by the transmission signals, harmonics, and spurious waves due to intermodulation distortion sneaking into reception paths.

Communication device 5 includes: antenna 2; RFIC 3 configured to process a radio frequency signal to be transmitted by antenna 2 and a radio frequency signal received by antenna 2; and radio frequency module 1 configured to transfer the radio frequency signals between antenna 2 and RFIC 3.

Accordingly, communication device 5 having reception sensitivity the deterioration of which is reduced can be provided.

OTHER EMBODIMENTS AND OTHERS

The above has described the radio frequency module and the communication device according to the present disclosure, using the embodiments and the examples, yet the radio frequency module and the communication device according to the present disclosure are not limited to the embodiments and the examples. The present disclosure also encompasses another embodiment achieved by combining arbitrary elements in the embodiments and the examples, variations as a result of applying various modifications that may be conceived by those skilled in the art to the embodiments and the examples without departing from the scope of the present disclosure, and various apparatuses that include the radio frequency module and the communication device according to the present disclosure.

For example, in the radio frequency modules and the communication devices according to the embodiments and the examples thereof, another circuit element and another line, for instance, may be disposed between circuit elements and paths that connect signal paths illustrated in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in communication apparatuses such as mobile phones, as a radio frequency module disposed in a front end portion that supports multiband technology.

The invention claimed is:
1. A radio frequency module, comprising:
a module board that includes a first principal surface and a second principal surface on opposite sides of the module board;

a transmission input terminal;
a reception output terminal;
an input/output terminal;
a first switch that includes:
- a common terminal connected to a common transmission path that is connected to the transmission input terminal;
- a first selection terminal connected to a first transmission path that is connected to the input/output terminal; and
- a second selection terminal connected to a second transmission path that is connected to the input/output terminal,
- the first switch configured to controllably switch connection of the common terminal between the first selection terminal and the second selection terminal;

a transmission power amplifier disposed on the module board and on the common transmission path; and
one or more first circuit components disposed on a reception path connected to the reception output terminal and the input/output terminal,
wherein the first transmission path is a signal path through which a transmission signal of a first communication band is transferred,
the second transmission path is a signal path through which a transmission signal of a second communication band is transferred,
the first switch is disposed on the first principal surface, and
at least one of the one or more first circuit components is disposed on the second principal surface.

2. The radio frequency module according to claim 1, wherein the one or more first circuit components include at least one of:
a reception low noise amplifier;
an inductor connected to an input terminal of the reception low noise amplifier;
a second switch configured to controllably switch between connection of the reception path to the reception low noise amplifier and disconnection of the reception path from the reception low noise amplifier;
a reception filter or a duplexer;
an LC filter that includes at least one of an inductor or a capacitor; or
an antenna switch connected to the input/output terminal or the LC filter, the antenna switch being configured to controllably switch among connection of the first transmission path to the input/output terminal, connection of the second transmission path to the input/output terminal, and connection of the reception path to the input/output terminal.

3. The radio frequency module according to claim 1, wherein an external-connection terminal is disposed on the second principal surface.

4. The radio frequency module according to claim 3, wherein the transmission power amplifier is mounted on the first principal surface.

5. The radio frequency module according to claim 4, further comprising:
a reception low noise amplifier,
wherein one of the one or more first circuit components is a second switch configured to controllably switch between connection of the reception path to the reception low noise amplifier and disconnection of the reception path from the reception low noise amplifier,
the second switch being disposed on the second principal surface, and
from a plan view of the module board, the transmission power amplifier and the second switch do not overlap, and the first switch and the second switch do not overlap.

6. The radio frequency module according to claim 4, further comprising:
a reception low noise amplifier; and
at least one of (i) an inductor connected to an input terminal of the reception low noise amplifier or (ii) one of a reception filter disposed on the reception path and a duplexer disposed on the reception path,
wherein one of the one or more first circuit components is a second switch configured to controllably switch between connection of the reception low noise amplifier to the reception path and disconnection of the reception low noise amplifier from the reception path,
the at least one of the inductor or the one of the reception filter and the duplexer is disposed on the first principal surface,
the second switch is disposed on the second principal surface, and
from a plan view of the module board, the second switch and the one of the reception filter and the duplexer overlap.

7. The radio frequency module according to claim 4, further comprising:
one of a transmission filter connected to the first switch and a duplexer connected to the first switch,
wherein the one of the transmission filter and the duplexer is mounted on the first principal surface, and
from a plan view of the first principal surface, the transmission power amplifier, the first switch, and the one of the transmission filter and the duplexer are disposed on the first principal surface in a stated order.

8. The radio frequency module according to claim 1, further comprising:
a reception low noise amplifier,
wherein the one or more first circuit components include at least one of (i) an inductor connected to an input terminal of the reception low noise amplifier or (ii) an LC filter that includes at least one of an inductor or a capacitor, the LC filter being connected to the input/output terminal,
an external-connection terminal is disposed on the first principal surface, and
the at least one of the inductor or the LC filter is disposed on the second principal surface.

9. A communication device, comprising:
an antenna;
a radio frequency (RF) signal processing circuit configured to process a radio frequency signal to be transmitted by the antenna and a radio frequency signal received by the antenna; and
the radio frequency module according to claim 1 configured to transfer the radio frequency signals between the antenna and the RF signal processing circuit.

10. The communication device according to claim 9, wherein the one or more first circuit components of the radio frequency module include at least one of:
a reception low noise amplifier;
an inductor connected to an input terminal of the reception low noise amplifier;
a second switch configured to controllably switch between connection of the reception path to the reception low noise amplifier and disconnection of the reception path from the reception low noise amplifier;

a reception filter or a duplexer;
an LC filter that includes at least one of an inductor or a capacitor; or
an antenna switch connected to the input/output terminal or the LC filter, the antenna switch being configured to controllably switch among connection of the first transmission path to the input/output terminal, connection of the second transmission path to the input/output terminal, and connection of the reception path to the input/output terminal.

11. The communication device according to claim 9, wherein the radio frequency module further comprising:
an external-connection terminal being disposed on the second principal surface.

12. The communication device according to claim 11, wherein the transmission power amplifier is mounted on the first principal surface.

13. The communication device according to claim 12, wherein the radio frequency module further comprises:
a reception low noise amplifier,
wherein one of the one or more first circuit components is a second switch configured to controllably switch between connection of the reception path to the reception low noise amplifier and disconnection of the reception path from the reception low noise amplifier,
the second switch being disposed on the second principal surface, and
from a plan view of the module board, the transmission power amplifier and the second switch do not overlap, and the first switch and the second switch do not overlap.

14. The communication device according to claim 12, wherein the radio frequency module further comprises:
a reception low noise amplifier; and
at least one of (i) an inductor connected to an input terminal of the reception low noise amplifier or (ii) one of a reception filter disposed on the reception path and a duplexer disposed on the reception path,
wherein one of the one or more first circuit components is a second switch configured to controllably switch between connection of the reception low noise amplifier to the reception path and disconnection of the reception low noise amplifier from the reception path,
the at least one of the inductor or the one of the reception filter and the duplexer is disposed on the first principal surface,
the second switch being disposed on the second principal surface, and
from a plan view of the module board, the second switch and the one of the reception filter and the duplexer overlap.

15. The communication device according to claim 12, wherein the radio frequency module further comprises:
one of a transmission filter connected to the first switch and a duplexer connected to the first switch,
wherein the one of the transmission filter and the duplexer is mounted on the first principal surface, and
from a plan view of the first principal surface, the transmission power amplifier, the first switch, and the one of the transmission filter and the duplexer is disposed on the first principal surface in a stated order.

16. The communication device according to claim 9, wherein the radio frequency module further comprises:
a reception low noise amplifier,
wherein the one or more first circuit components include at least one of (i) an inductor connected to an input terminal of the reception low noise amplifier or (ii) an LC filter that includes at least one of an inductor or a capacitor, the LC filter being connected to the input/output terminal,
an external-connection terminal is disposed on the first principal surface, and
the at least one of the inductor or the LC filter is disposed on the second principal surface.

17. A radio frequency module, comprising:
a module board that includes a first principal surface and a second principal surface on opposite sides of the module board;
a transmission input terminal;
a reception output terminal;
an input/output terminal;
a transmission power amplifier connected to the transmission input terminal;
a first transmission filter connected to the input/output terminal;
a second transmission filter connected to the input/output terminal;
a first switch that includes:
a common terminal connected to an output terminal of the transmission power amplifier;
a first selection terminal connected to the first transmission filter; and
a second selection terminal connected to the second transmission filter,
the first switch configured to controllably switch between connection of the common terminal to the first selection terminal and to the second selection terminal; and
one or more first circuit components connected to the reception output terminal and the input/output terminal,
wherein the first switch is disposed on the first principal surface, and
at least one of the one or more first circuit components is disposed on the second principal surface.

18. The radio frequency module according to claim 17, comprising:
a first duplexer that includes:
a first common terminal connected to the input/output terminal;
the first transmission filter connected to the first common terminal; and
a first reception filter connected to the first common terminal; and
a second duplexer that includes:
a second common terminal connected to the input/output terminal;
the second transmission filter connected to the second common terminal; and
a second reception filter connected to the second common terminal,
wherein the first reception filter is one of the one or more first circuit components, and
the second reception filter is one of the one or more first circuit components.

19. A radio frequency module, comprising:
a module board that includes a first principal surface and a second principal surface on opposite sides of the module board;
a transmission input terminal;
a reception output terminal;
an input/output terminal;
a first transmission filter connected to the input/output terminal;

a second transmission filter connected to the input/output terminal;

a first switch that includes:
- a common terminal connected to the transmission input terminal;
- a first selection terminal connected to the first transmission filter; and
- a second selection terminal connected to the second transmission filter,
- the first switch configured to controllably switch connection of the common terminal between the first selection terminal and the second selection terminal; and one or more first circuit components connected to the reception output terminal and the input/output terminal, wherein the first switch is disposed on the first principal surface, and at least one of the one or more first circuit components is disposed on the second principal surface.

20. The radio frequency module according to claim 19, comprising:

a first duplexer that includes:
- a first common terminal connected to the input/output terminal;
- the first transmission filter connected to the first common terminal; and
- a first reception filter connected to the first common terminal; and a second duplexer that includes:
- a second common terminal connected to the input/output terminal;
- the second transmission filter connected to the second common terminal; and
- a second reception filter connected to the second common terminal, wherein the first reception filter is one of the one or more first circuit components, and the second reception filter is one of the one or more first circuit components.

* * * * *